United States Patent
Boddu

(10) Patent No.: US 10,565,611 B2
(45) Date of Patent: Feb. 18, 2020

(54) CONTROLLING REAL-TIME EXECUTION OF INTERNET COMMUNICATION CAMPAIGNS WITH PARAMETERIZABLE FLOW CONTROL STRUCTURES

(71) Applicant: ORACLE INTERNATIONAL CORPORATION, Redwood Shores, CA (US)

(72) Inventor: Navin Boddu, Pleasanton, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 698 days.

(21) Appl. No.: 14/802,823

(22) Filed: Jul. 17, 2015

(65) Prior Publication Data

US 2016/0019576 A1  Jan. 21, 2016

Related U.S. Application Data

(60) Provisional application No. 62/026,470, filed on Jul. 18, 2014.

(51) Int. Cl.
G06Q 30/02 (2012.01)
(52) U.S. Cl.
CPC .............. G06Q 30/0241 (2013.01)
(58) Field of Classification Search
CPC .................................. G06Q 30/0241
See application file for complete search history.

(56) References Cited

U.S. PATENT DOCUMENTS

| 1,092,006 A | 3/1914 | Bailey |
| 3,218,663 A | 11/1965 | Joseph et al. |
| 5,790,858 A | 8/1998 | Vogel |

(Continued)

FOREIGN PATENT DOCUMENTS

WO  WO 03036420 A2  5/2003

OTHER PUBLICATIONS

"How to set up an SMS campaign system", by Guest. Feb. 23, 2010. pp. 1-23. (Year: 2010).*
"SMS Marketing for Small Businesses: How your small business can thrive with easy, affordable, test message marketing!", by Joshua Malin. Published by Ez Texting. Apr. 2012: First Edition. pp. 1-46. (Year: 2012).*

(Continued)

*Primary Examiner* — William A Brandenburg
(74) *Attorney, Agent, or Firm* — Potomac Law Group, PLLC

(57) ABSTRACT

Systems and methods for real-time control of Internet messaging campaigns. Processing commences upon retrieving a computer-readable schematic capture or other computer representation of an Internet messaging campaign or marketing campaign flow. During execution of the campaign flow, decision points in the form of program stage gates as given in the schematic are reached, and corresponding program stage gate expressions are evaluated based on then-current real-time conditions or values. When the program stage gate expression evaluates to one of a set of alternative values (e.g., "take forward path" or "take alternative path1" or "take alternative path2"), then the program execution will initiate a set of execution actions given in the marketing campaign schematic. In cases when then-current real-time conditions or values evaluate to an alternate value or in cases when the real-time conditions or values are not available or cannot be evaluated within a timeout period, then remedial action is initiated.

20 Claims, 23 Drawing Sheets

(56) References Cited

U.S. PATENT DOCUMENTS

| | | | |
|---|---|---|---|
| 5,826,239 | A | 10/1998 | Du et al. |
| 6,665,677 | B1 | 12/2003 | Wotring et al. |
| 7,132,015 | B2 | 11/2006 | Wen et al. |
| 7,756,256 | B1 | 7/2010 | Rukman et al. |
| 7,873,376 | B2 | 1/2011 | Coelho |
| 8,090,612 | B2 | 1/2012 | Chao et al. |
| 8,417,678 | B2 | 4/2013 | Bone et al. |
| 8,510,264 | B1 | 8/2013 | Tamm et al. |
| 8,719,225 | B1 | 5/2014 | Rath |
| 8,771,662 | B2 | 7/2014 | Zhao et al. |
| 8,775,448 | B2 | 7/2014 | Tuatini et al. |
| 8,839,256 | B2 | 9/2014 | Achilles et al. |
| 8,869,256 | B2 | 10/2014 | Sample |
| 9,031,586 | B1 | 5/2015 | Kilpatrick et al. |
| 9,247,401 | B2 | 1/2016 | Lauder |
| 9,754,265 | B2 | 9/2017 | Seelig et al. |
| 2002/0087404 | A1 | 7/2002 | Silkey et al. |
| 2003/0144898 | A1 | 7/2003 | Bibelnieks et al. |
| 2003/0195862 | A1 | 10/2003 | Harrell et al. |
| 2004/0015504 | A1 | 1/2004 | Ahad et al. |
| 2004/0078538 | A1 | 4/2004 | Dutt et al. |
| 2004/0204973 | A1 | 10/2004 | Witting et al. |
| 2005/0071252 | A1 | 3/2005 | Henning et al. |
| 2005/0192986 | A1 | 9/2005 | Butler |
| 2005/0259575 | A1 | 11/2005 | Krishnamurthi et al. |
| 2006/0053181 | A1 | 3/2006 | Anand et al. |
| 2006/0190355 | A1 | 8/2006 | Jammes et al. |
| 2006/0253318 | A1 | 11/2006 | Ramsey et al. |
| 2007/0100783 | A1 | 5/2007 | Cialini et al. |
| 2007/0156842 | A1 | 7/2007 | Vermeulen et al. |
| 2007/0208602 | A1 | 9/2007 | Nocera et al. |
| 2007/0250505 | A1 | 10/2007 | Yang et al. |
| 2007/0294663 | A1 | 12/2007 | McGuire et al. |
| 2008/0005547 | A1 | 1/2008 | Papakipos et al. |
| 2008/0027788 | A1 | 1/2008 | Lawrence et al. |
| 2008/0040191 | A1 | 2/2008 | Chakravarty et al. |
| 2008/0065435 | A1 | 3/2008 | Ratzloff |
| 2008/0262925 | A1 | 10/2008 | Kim et al. |
| 2008/0320146 | A1 | 12/2008 | Norlund et al. |
| 2009/0063474 | A1 | 3/2009 | Curry et al. |
| 2009/0076908 | A1 | 3/2009 | Ingleshwar et al. |
| 2010/0070448 | A1 | 3/2010 | Omoigui et al. |
| 2010/0250477 | A1 | 9/2010 | Yadav |
| 2010/0274661 | A1 | 10/2010 | Aaltonen et al. |
| 2011/0016123 | A1 | 1/2011 | Pandey et al. |
| 2011/0029375 | A1 | 2/2011 | Mason |
| 2011/0099152 | A1 | 4/2011 | Law et al. |
| 2011/0282735 | A1 | 11/2011 | Kordis et al. |
| 2012/0130802 | A1 | 5/2012 | Shimizu |
| 2012/0173340 | A1* | 7/2012 | Zhao .................. G06Q 30/0251 705/14.66 |
| 2012/0191546 | A1 | 7/2012 | Phelan et al. |
| 2013/0282837 | A1* | 10/2013 | Mayala ................ G06Q 10/107 709/206 |
| 2014/0025763 | A1* | 1/2014 | Furlong .................. H04L 51/12 709/206 |
| 2014/0181039 | A1 | 6/2014 | Harrison et al. |
| 2014/0181579 | A1 | 6/2014 | Whitehead et al. |
| 2015/0026236 | A1 | 1/2015 | Solter et al. |
| 2015/0038181 | A1 | 2/2015 | Magadevan et al. |
| 2015/0294349 | A1* | 10/2015 | Capel ................. G06Q 30/0267 705/14.43 |

OTHER PUBLICATIONS

Non-final Office Action dated Jan. 22, 2016 for related U.S. Appl. No. 12/985,269.
Non-final Office Action dated Sep. 29, 2016 for related U.S. Appl. No. 14/564,658.
Non-Final Office Action for U.S. Appl. No. 12/985,269 dated Feb. 27, 2013.
Final Office Action for U.S. Appl. No. 12/985,269 dated Sep. 24, 2013.
Advisory Action for U.S. Appl. No. 12/985,269 dated Jan. 16, 2014.
Advisory Action for U.S. Appl. No. 12/985,269 dated Dec. 13, 2013.
Non-Final Office Action for U.S. Appl. No. 13/229,610 dated Oct. 4, 2013.
Non-Final Office Action for U.S. Appl. No. 13/229,610 dated Jul. 18, 2012.
Final Office Action for U.S. Appl. No. 13/229,610 dated Jan. 31, 2013.
Non-final Office Action dated Jul. 10, 2014 for U.S. Appl. No. 12/985,269.
Non-final Office Action dated Oct. 17, 2014 for U.S. Appl. No. 13/229,610.
Final Office Action dated Oct. 30, 2014 for U.S. Appl. No. 12/985,269.
Non-final Office Action dated Apr. 6, 2015 for U.S. Appl. No. 12/985,269.
Final Office Action dated May 26, 2015 for U.S. Appl. No. 13/229,610.
Final Office Action dated Jul. 22, 2015 for related U.S. Appl. No. 12/985,269.
Non-final Office Action dated Sep. 25, 2015 for related U.S. Appl. No. 13/229,610.
FrancescoChemolli, SquidFaq, InnerWorkings, Squid Web Proxy Wiki, Oct. 27, 2013, 17 pages.
Twilio, Inc., "TwiML Message: Twilio's Request", Mar. 26, 2013, 2 pages.
Mobivate, "psms aggregator", Jan. 14, 2013, 3 pages.
Ford, "IT Research BYTE" LOL: Laugh out Loud or Lots of Love? Integrating SMS into Ford Business Processes, Jun. 25, 2010, 6 pages.
Tata Communications, "Mobile Messaging Exchange", 2013, 2 pages.
ExactTarget, "SMS Marketing Term of the Day: Aggregator", Jun. 30, 2009, 3 pages.
Aruhat, "SMS Aggregators: Make sure that your gateways are the best used to give Excellent Services", Mar. 28, 2014, 6 pages.
International Search Report and Written Opinion dated Oct. 15, 2015 for related PCT Patent Application No. PCT/US2015/040225, 11 pages.
Edith Cohen, et al., "Refreshment policies for Web content caches", Computer Networks, Nov. 8, 2001, 14 pages.
Non-final Office Action dated Dec. 21, 2015 for related U.S. Appl. No. 14/029,390.
Alkis Simitsis, "Optimizing Analytic Data Flows for Multiple Execution Engines", May 20-24, 2012.
Notice of Allowance and Fee(s) due dated May 3, 2016 for related U.S. Appl. No. 14/029,390.
Notice of Allowance and Fee(s) due dated May 27, 2016 for related U.S. Appl. No. 12/985,269.

* cited by examiner

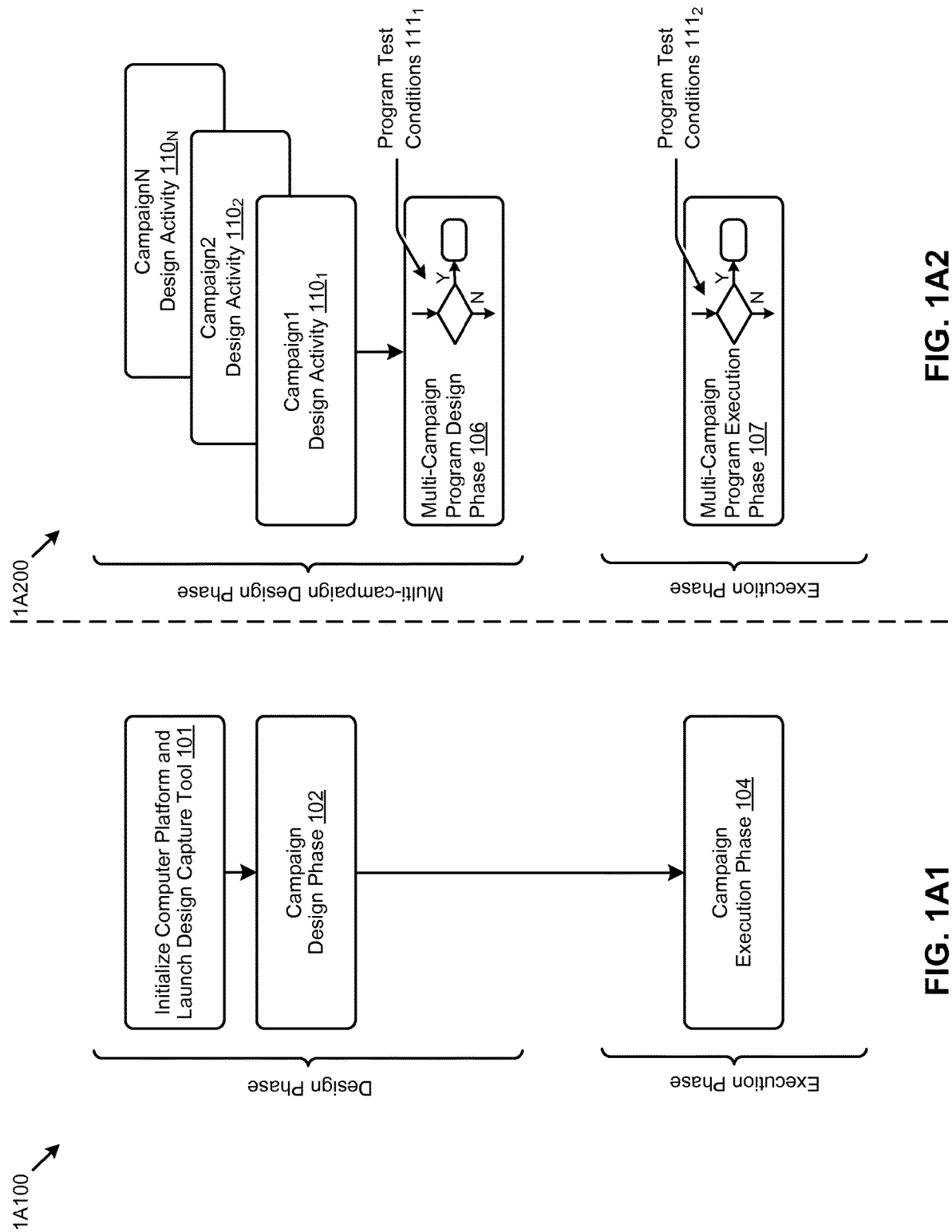

| Row | Static Data Item Campaign Semantics 116 | Real-Time Data Item Campaign Semantics 118 | Marketing Program Execution Phase Semantics 120 |
|---|---|---|---|
| 1 | Send personalized emails to ListA using ContentA | Send personalized emails to ListA using ContentA1 | Send personalized messages to recipients in ListQ using ContentQ but only the first 500k enactments |
| 2 | Send personalized SMS messages to ListA using ContentA | Send personalized emails to ListB using ContentB | Send personalized messages to ListR using ContentR but only if the number of recipients in ListR is in the range 10k-100k, else wait |
| 3 | | Send personalized emails to ListD using ContentD but only when age >=40, else use ContentE | Send personalized messages to ListR using ContentR1 for the first 1-10k recipients in ListR, else use ContentR2 for the recipients 10,001-20,000 in ListR |
| 4 | | Send personalized emails to ListE using ContentE1 but only for the first 20% of enactments, else use ContentE2 | Send personalized messages to ListS using ContentS but between the hours of 9am to 12noon, else wait one day |
| 5 | | | Send personalized messages to ListT using ContentT but only between the hours of 9am to 12noon and only a maximum of 50k enactments, else wait until next time |

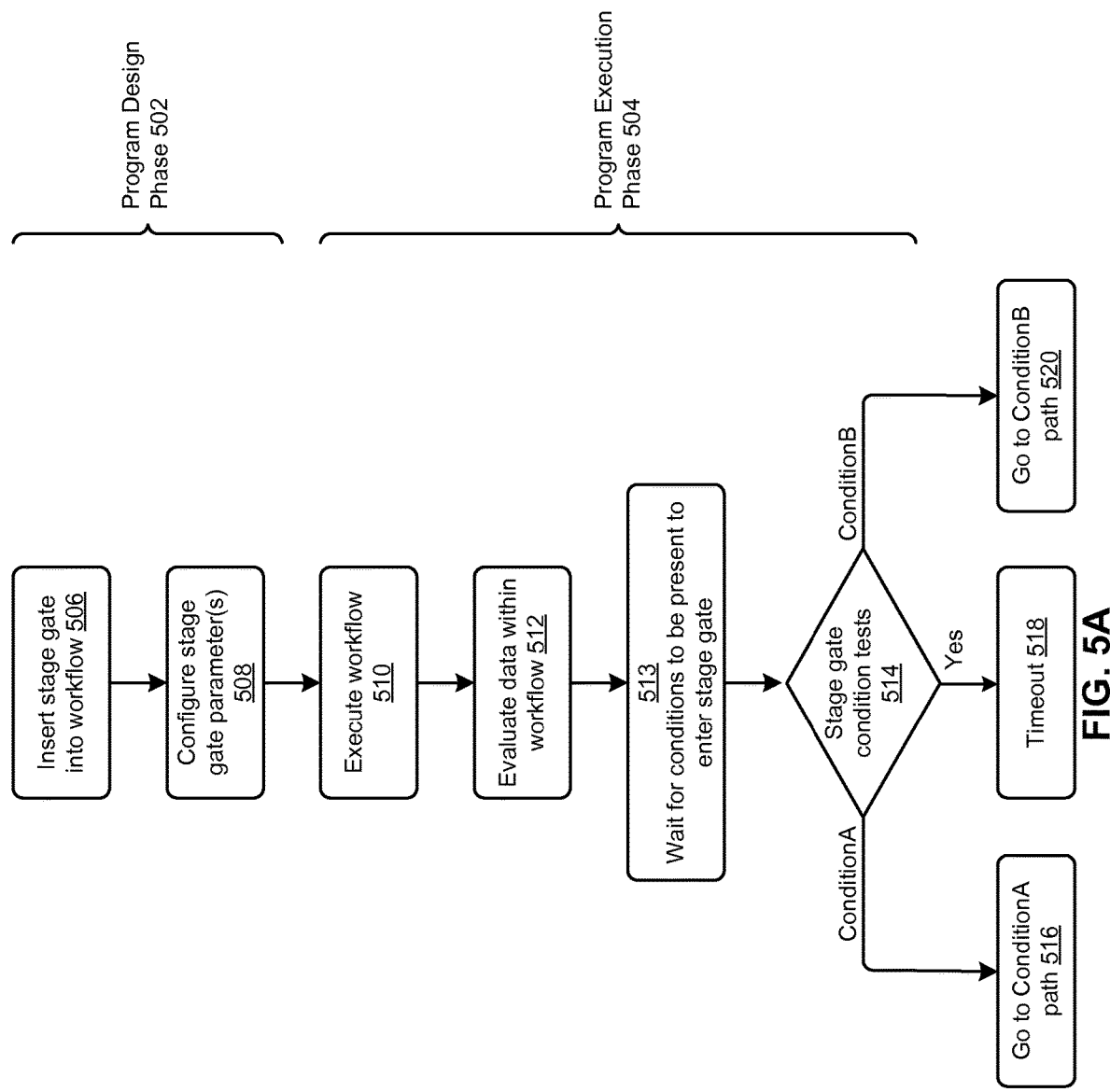

CONTROLLING REAL-TIME EXECUTION OF INTERNET COMMUNICATION CAMPAIGNS WITH PARAMETERIZABLE FLOW CONTROL STRUCTURES

RELATED APPLICATIONS

The present application claims the benefit of priority to U.S. Patent Application Ser. No. 62/026,470 titled, "SYSTEM AND METHOD FOR IMPLEMENTING PROGRAM STAGE GATES IN A BUSINESS PROCESS WORKFLOW" filed Jul. 18, 2014, which is hereby incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

This disclosure relates to digital channel marketing software tools, and more particularly to techniques for controlling real-time execution of digital communications using parameterizable flow control structures.

BACKGROUND

Marketers are continually seeking better ways to create, execute, and automate marketing and messaging campaigns with the goal of growing revenue and strengthening customer loyalty. A workflow engine such as a business process management (BPM) engine can be used to design and implement business execution actions, including such messaging and marketing campaigns. For example, a marketer can use a user interface to configure a BPM engine to progress through a series of connected workflow execution components. Some BPM engines allow the marketer to visually design, manage, and automate a multistage marketing program through a drag-and-drop user interface and a library of pre-built program operation and steering components that are used to progress through the multistage marketing program.

One aspect of such multistage marketing programs involves delivery of personalized messages (e.g., web page components, an advertising message, an email communication, a text message, a mobile message, etc.). In a conventional process for generating personalized messages, the marketer designs a template during a design phase for a personalized message that includes stock message sections and personalization sections. The stock message sections contain standardized portions that are the same for all recipients of the personalized message. The personalization sections include commands defined by the marketer that invoke queries to the marketer's relational database system so as to retrieve the marketer's recipient or audience data, which data is in turn used for generating personalized messages to be sent to the recipients in the audience. During a program execution phase, the workflow execution components will execute queries over recipient or audience records in a database, and use the retrieved data for populating any personalization sections of a template. The personalized messages are sent over the internet to the targeted recipients.

In some situations, marketers would like to control the execution of one or more marketing campaigns based on then-current real-time conditions (e.g., to take alternative execution paths based on then-current conditions). Prior attempts to provide the marketer a way to describe such condition (e.g., through a drag-and-drop user interface and a library of pre-built program templates for steering) have been limited in their function and benefit. What is needed is a technique or techniques to improve over legacy approaches.

SUMMARY

The present disclosure provides systems, methods, and computer program products suited to address the aforementioned issues with legacy approaches. More specifically, the present disclosure provides a detailed description of techniques used in systems, methods, and in computer program products for controlling real-time execution of internet communication campaigns with parameterizable flow control structures. Certain embodiments are directed to technological solutions for providing a set of parameterizable flow control structures that correspond to real-time conditions that are detectable during the execution of internet-based messaging programs, which embodiments advance the relevant technical fields as well as advancing peripheral technical fields. The disclosed embodiments modify and improve over legacy approaches. In particular, the herein-disclosed techniques provide technical solutions that address the technical problems attendant to multistage marketing programs involving delivery of personalized messages needing a rich set of semantics and corresponding parameterizable flow control structures, and such technical solutions serve to reduce use of computer memory, reduce demand for computer processing power, and reduce communication overhead needed. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of high-performance computing as well as advances in the technical fields of Internet messaging.

Some embodiments commence upon retrieving a data structure such as a computer-readable schematic capture or other representation of a marketing campaign flow. During execution of the marketing campaign flow, decision points given in the schematic are reached, and corresponding stage gate expressions are evaluated based on then-current real-time conditions or values. When the stage gate expression evaluates to one of a set of alternative values (e.g., "take forward path" or "take alternative path1" or "take alternative path2"), then the program execution will initiate a set of execution actions that correspond to a predefined marketing campaign flow path. In cases when then-current real-time conditions or values evaluate to an alternate value or in cases when the real-time conditions or values are not available or cannot be evaluated within a timeout period, then remedial action is initiated.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

The drawings described below are for illustration purposes only. The drawings are not intended to limit the scope of the present disclosure.

FIG. 1A1 is a flowchart showing phases of a single campaign flow.

FIG. 1A2 is a flowchart showing phases of a multiple-campaign marketing program flow that uses parameterizable flow control to control real-time execution of internet communication programs, according to an embodiment.

FIG. 1B1 through 1B3 present comparative program flow semantics used in systems for controlling real-time execution of internet communication campaigns with parameterizable flow control structures, according to some embodiments.

FIG. 2 exemplifies a multi-arm campaign prosecution flow that implements components for controlling real-time execution of internet communication campaigns with parameterizable flow control structures, according to some embodiments.

FIG. 3 depicts real-time processing during concurrent campaign prosecution paths taken during prosecution of marketing campaign programs with parameterizable flow control structures, according to some embodiments.

FIG. 5A depicts a marketing program flow showing portions of a program design phase and portions of a program execution phase for designing and executing marketing campaign programs using parameterizable flow control structures, according to an embodiment.

DETAILED DESCRIPTION

Figure 1C:
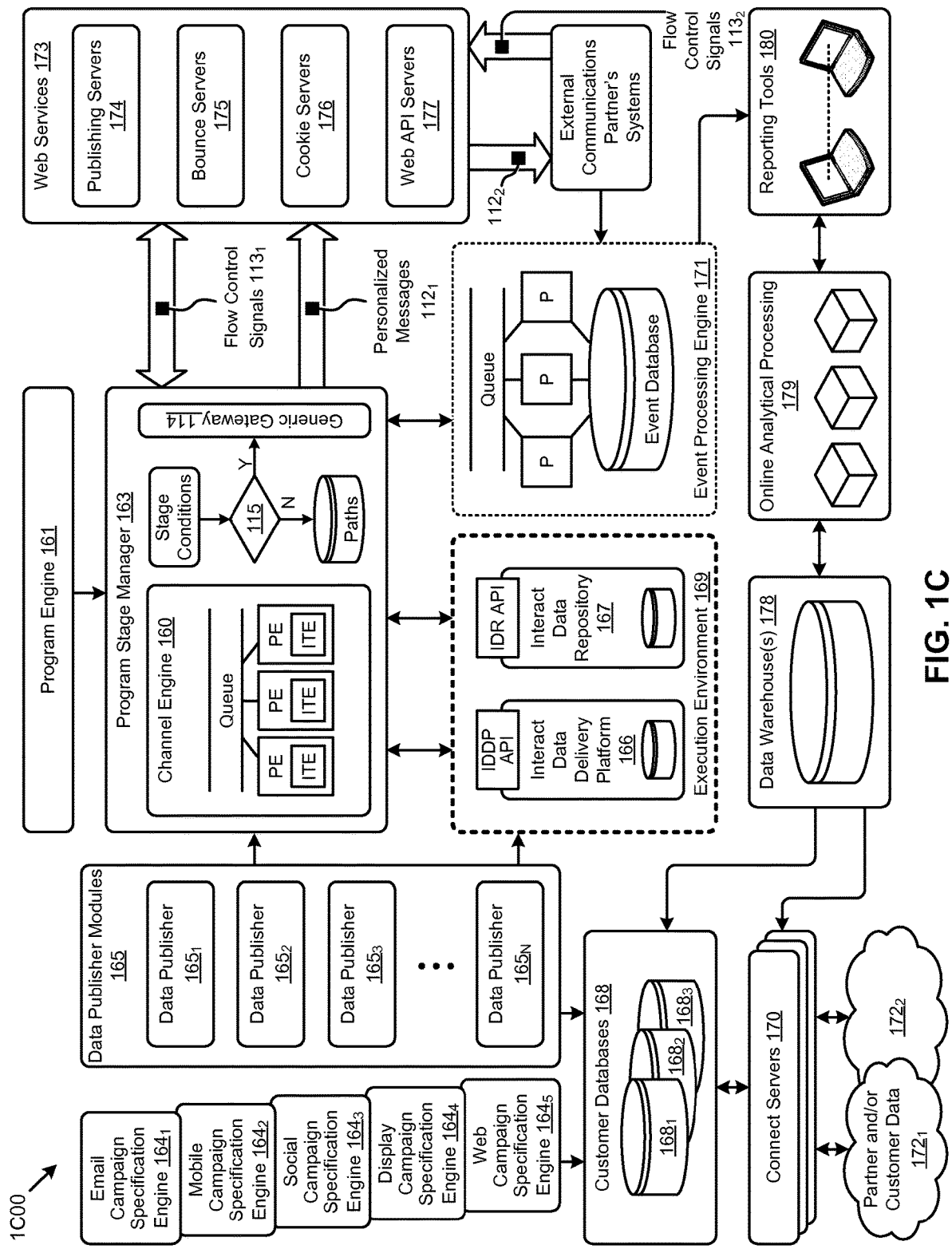
FIG. 1C is a block diagram of a marketing program system that implements components for controlling real-time execution of internet communication campaigns with parameterizable flow control structures, according to some embodiments.

Some embodiments of the present disclosure address the problem of multistage marketing programs involving delivery of personalized messages that need a rich set of semantics and corresponding parameterizable flow control structures. Some embodiments are directed to approaches for providing a set of parameterizable flow control structures that correspond to real-time conditions that are detectable during the prosecution of internet-based messaging programs. More particularly, disclosed herein and in the accompanying figures are exemplary environments, systems, methods, and computer program products for controlling real-time execution of internet communication campaigns with parameterizable flow control structures.

Overview

Marketing campaign designers can design multistage marketing programs using a drag-and-drop user interface and a library of pre-built program operation and steering components that are used to track and steer progress through the multistage marketing program. In some situations, marketers would like to control the prosecution of one or more marketing campaigns based on then-current real-time conditions (e.g., to take alternative prosecution paths based on then-current conditions). Multistage marketing programs involving delivery of personalized messages can be designed and administered using a set of pre-built program operation and steering components with powerful semantics. An exemplary set of such program operation and steering components are disclosed herein.

Various embodiments are described herein with reference to the figures. It should be noted that the figures are not necessarily drawn to scale and that the elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, reference throughout this specification to "some embodiments" or "other embodiments" refers to a particular feature, structure, material, or characteristic described in connection with the embodiments as being included in at least one embodiment. Thus, the appearances of the phrase "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A1 is a flowchart showing phases of a single campaign flow 1A100. As an option, one or more variations of single campaign flow 1A100 or any aspect thereof may be implemented in the context of the architecture and functionality of the embodiments described herein. Also, the single campaign flow 1A100 or any aspect thereof may be implemented in any environment.

A marketing campaign can be designed using computer-aided tools. As shown, a computing environment can be used by a marketer to capture characteristics of a marketing or messaging campaign (see. step 101). A program design phase is entered (see step 102), and when the design of the campaign is deemed completed (e.g., deemed completed by the marketer), then the campaign progresses to an execution phase (see step 104).

Such a sequence of steps in the shown phases serves to design and implement certain types of messaging or marketing campaigns. In some situations, a campaign might be implemented as a set of campaigns that are designed and executed with some concurrency. Such a scenario is shown and described as pertains to FIG. 1A2.

Figure 2:
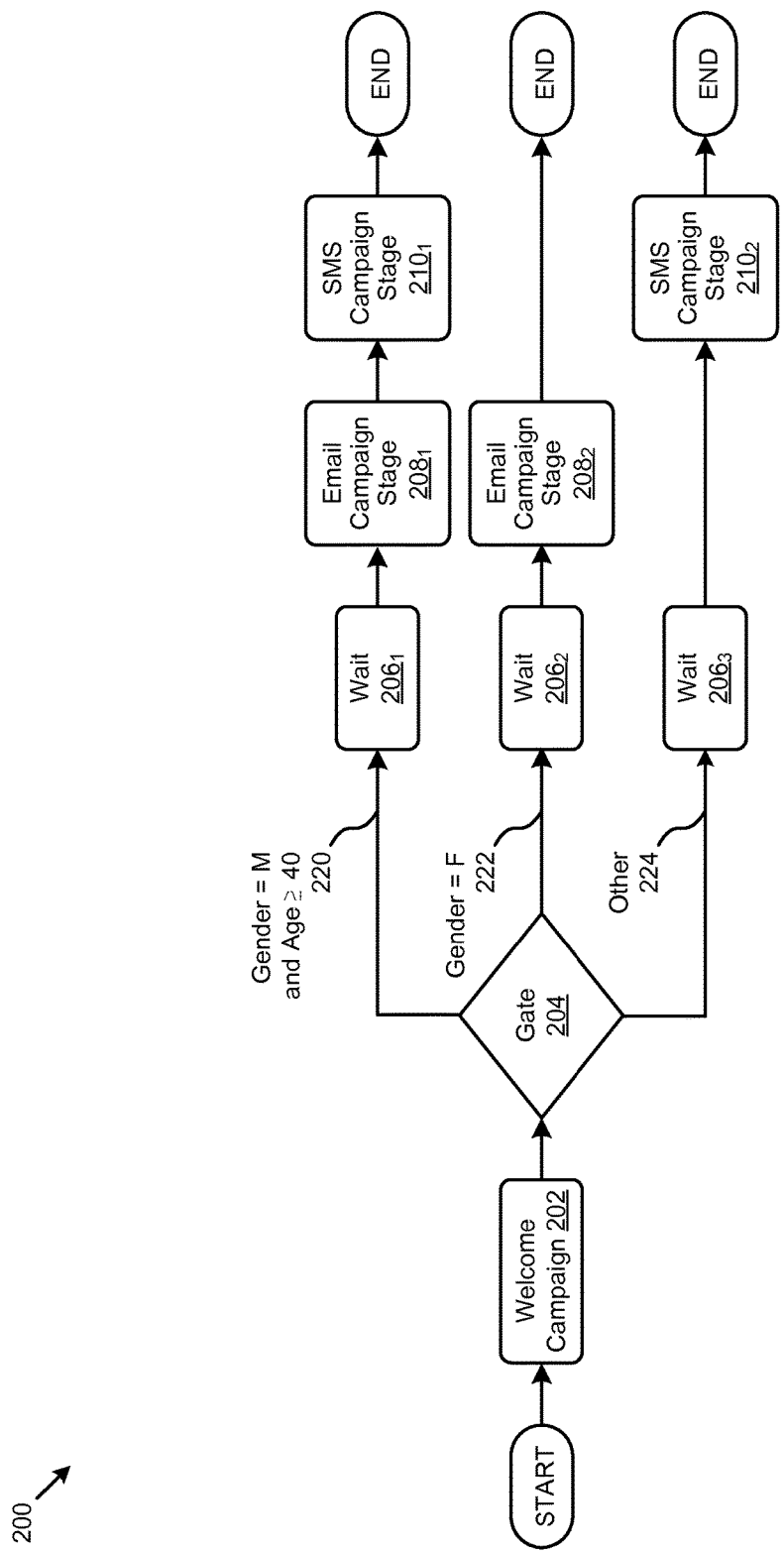

FIG. 1A2 is a flowchart showing phases of a multiple-campaign marketing program flow 1A200 that uses parameterizable flow control to control real-time execution of internet communication programs. As an option, one or more variations of multiple-campaign marketing program flow 1A200 or any aspect thereof may be implemented in the context of the architecture and functionality of the embodiments described herein. Also, the multiple-campaign marketing program flow 1A200 or any aspect thereof may be implemented in any environment.

Multiple campaigns might be designed through multiple design activities (e.g., campaign1 design activity $110_1$, campaign2 design activity $110_2$, campaignN design activity $110_N$), and any one or two or more of those campaigns can be interrelated with any other campaign(s). In some cases the progression of one campaign might be determined in part by the progression and results or other conditions in another campaign. Various test conditions can be entered and stored (e.g., in a design database), which can be later retrieved and used during the course of execution of any one or more of the interrelated campaigns. As shown, a multi-campaign program design phase 106 is entered and program test conditions (e.g., program test condition $111_1$) are captured so as to be evaluated during the course of execution of the campaigns. Any number of such program test conditions can be captured and applied to any campaign, and any number of such program test conditions can refer to aspects of any other campaign or campaigns. Moreover, a program test condition might be defined so as to capture budgetary limitations of one or more campaigns that might incur expenses over time (e.g., over the time period that the campaign is run). More particularly, one or more campaigns in a program of campaigns might be executed during an execution phase (e.g., see multi-campaign program execution phase 107), and any of the concurrently executing constituents of the program might encounter one or more program test conditions (e.g., program test condition $111_2$), the evaluation of which program test conditions might in turn cause the constituent campaign to take one or another of several alternative paths or actions.

For example, consider a scenario where a marketer has a limited budget for a marketing campaign, and only wishes to execute the campaign if the number of recipients is below and/or above a certain threshold level. This type of flow involves program test conditions (e.g., program test condition $111_2$) that would cause the campaign to take one path (e.g., the path to continue the campaign and spend more budget) or an alternative path (e.g., to halt spending in the program so as to stay within budget).

Figure 3:
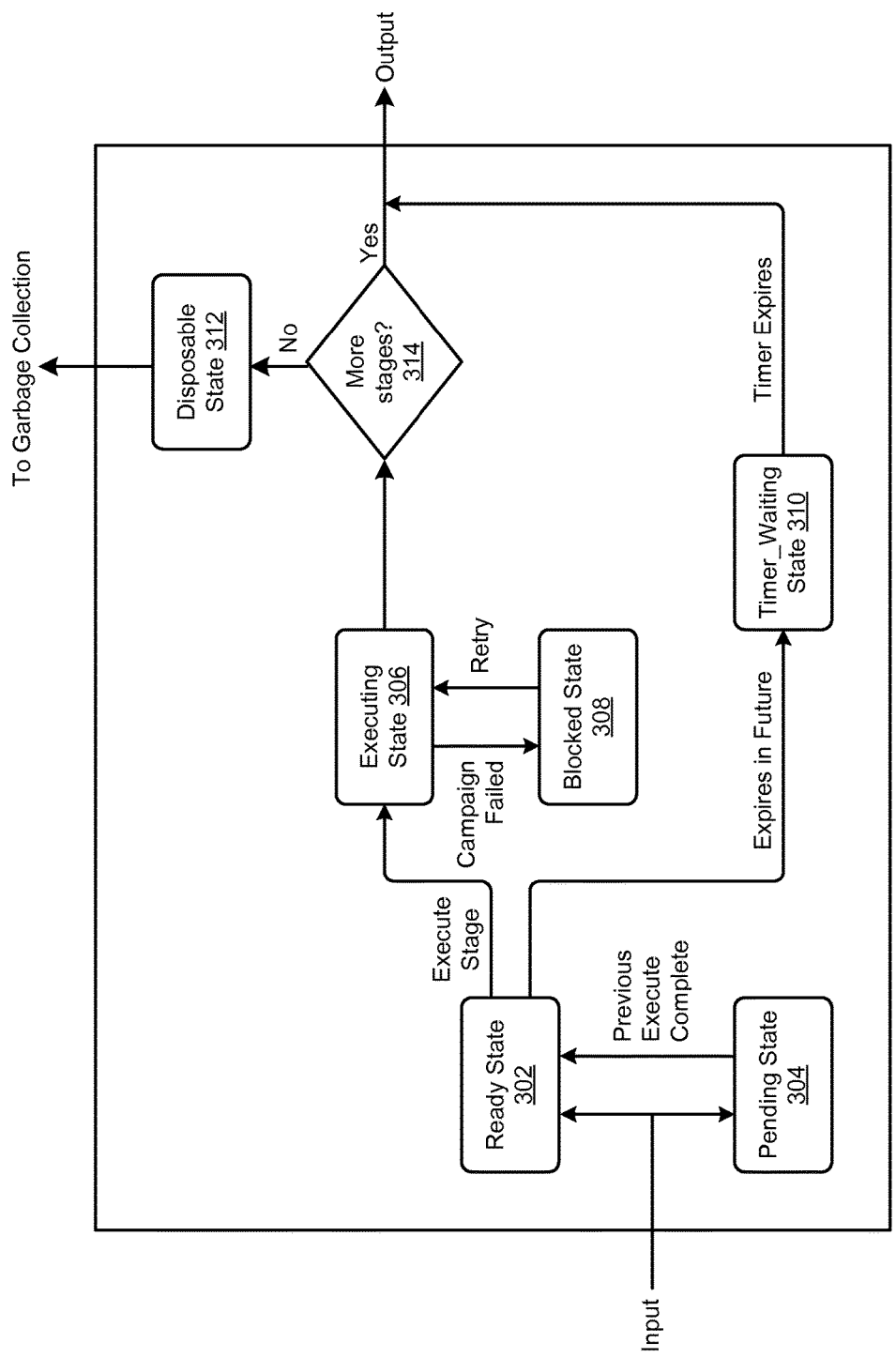

FIG. 1B1 through 1B3 present comparative program flow semantics (see semantics 1B100, semantics 1B200, and semantics 1B300) used in systems for controlling real-time execution of internet communication campaigns with parameterizable flow control structures. As an option, one or more variations of program flow semantics or any aspect thereof may be implemented in the context of the architecture and functionality of the embodiments described herein. Also, the program flow semantics shown or any aspect thereof may be implemented in any environment.

The embodiment shown in FIG. 1B1, static data item campaign semantics 116 can personalize emails (see row 1)

and/or SMS messages (see row 2) based on a particular message (e.g., contentA). The shown semantics 1B200 includes the semantics of FIG. 1B1 and extends the semantics (see row 3) to include a conditional (e.g., use contentD or use contentE) based on the value of a static data element with respect to a value expression that can be evaluated prior to the execution phase. The semantics 1B200 further extends the semantics to include real-time data value and a conditional expression. The real-time data value cannot be known unambiguously prior to the execution phase. In the example given in row 4, the conditional expression uses contentE1 or uses contentE2 based on the value of a real-time variables with respect to a condition that is evaluated repeatedly during the execution phase. The semantics 1B200 (real-time data item campaign semantics 118) might be invoked when an advertiser wishes to offer a coupon such as is included in contentE1 to only a first set or portion of the recipients (e.g., the first 20% of recipients) selected from the then-current list="ListE". The remaining recipients will not receive the coupon included in contentE 1; instead, they will receive the messaging of contentE2.

The marketing program execution phase semantics 120 extend the real-time data item semantics to include a cap or maximum threshold (see row 1) to test using a real-time comparison to a then-current number of enactments (e.g., number of email messages queued, number of SMS messages queued, etc.). The marketing program execution phase semantics 120 further includes range tests against then-current real-time values (e.g., number of recipients), multiple range selection conditioned against then-current real-time values (e.g., number of enactments), date and time tests against then-current real-time values (e.g., date, day of week, timestamps, etc.), and traffic-shaping throttling based on then-current real-time dates or other values.

FIG. 1C is a block diagram of a marketing program system 1C00 that implements components for controlling real-time execution of internet communication campaigns with parameterizable flow control structures. As an option, one or more variations of marketing program system 1C00 or any aspect thereof may be implemented in the context of the architecture and functionality of the embodiments described herein. Also, the marketing program system 1C00 or any aspect thereof may be implemented in any environment.

The design portion of the architecture comprises any number of entities that designs marketing campaigns (e.g., to be executed in a software as a service (SaaS) architecture). One or more instances of a campaign specification engine are used to design and implement the marketing campaigns. These campaign specification engines can be implemented, for example, as applications (e.g., an email campaign specification engine $164_1$, etc.) running on computing systems to design campaigns tailored for specific channels/mediums. Such channels/mediums include, for example, email, SMS or other mobile applications, social media, web outlets, and various types of displays. A marketing person can use the application to design the content to appear in the email campaign (e.g., text, images, video, etc.), which can then be stored into the database. This database is referred to herein as the "customer database" to reference the fact that these campaign designers may be the customer to the provider of the SaaS service/system. In one embodiment, the application is provided to allow the user to visually design, manage, and automate a multistage lifecycle program through a drag-and-drop user interface and a library of pre-built program templates.

The designer of the campaign may also design a business workflow for the campaign. A business process management engine or workflow engine (shown in the figure as the program engine 161) can be used to implement the business execution actions or workflows for the campaign. The program engine comprises any entity or application that observes the various decision points and/or paths to implement the business workflow for the campaigns, which may be implemented as a multistage marketing campaign. The campaign marketer may also provide data pertaining to the individuals to whom a marketing campaign is directed. This may include, for example, lists of customers/targets or other forms of recipients, as well as instructions to identify the subsets of the customer lists that should be the targets of the campaign. For example, one common business process to be implemented by the campaigns involves personalized messages $112_1$, which may be sent as a personalized web page, a personalized advertisement, a personalized email communication, a personalized text message, or a personalized mobile message. The database may therefore include relational data pertaining to customer records in the database (e.g., a relational database management system or RDBMS).

Data publisher modules publish the data from the customer database to storage structures that hold the campaign and personalization data to the execution environment. A data delivery platform (which may include the interact data delivery platform (IDDP)), is provided to hold the campaign and personalization data (e.g., in various data caches). The IDDP comprises a data caching mechanism and the interact data repository (ICR) comprises a data repository where the combination of these mechanisms is used to store the campaign/personalization data.

The execution environment 169 comprises one or more servers that perform the business processing for the marketing campaigns. In a SaaS architecture, these servers may be used to service marketing campaigns for multiple customers. In some embodiments, the execution environment comprises an independent execution environment that is isolated from design and data management. The execution environment uses an in-memory cache of the personalization data that is kept in sync with the master data that is located in the design environment. As the cache data is synchronized, metadata is kept in the execution environment that specifies how recent the cached data is compared to the time given in master database. As the personalization data is looked up from the cache, the system maintains the cache with consistent and up-to-date data.

In some embodiments, different types of engines may be provided to handle the different channels/types of marketing campaigns to be executed. For example, for an email campaign, an email channel engine is used, which includes a program stage manager to manage the email channel execution. This entity (e.g., a process or thread) manages the work placed into a queue for processing by various personalization engines (PEs). An interactive template engine (ITE) can be employed by the personalization engine to perform the message personalization. The personalized emails are then sent to an email gateway to be processed for transmission to the campaign targets. A similar engine is provided for other channels such as the mobile, social, display, and web channels. This architecture is particularly efficient and scalable to handle large numbers of messages to be personalized.

Control of one or more campaign execution flows can be facilitated by the occurrence of one or more program stage gates in a predefined campaign execution flow. One example is shown in this FIG. 1C using the schematic representation of a predefined stage gate decision point within a program stage gate condition evaluation module 115. A program stage gate condition evaluation module serves to detect and/or evaluate real-time conditions, and based on the characteristics or results of the evaluation, one or more of several paths are entered. Strictly as one example, certain real-time conditions presented at the time of processing in the program stage gate condition evaluation module 115 might enter a path to send a personalized message to a communication partner, possibly through a generic gateway 114, as shown.

In some embodiments, a common gateway is provided to handle personalized messages for multiple ones of the channels, rather than providing an individual gateway for each channel engine. In this approach, the common gateway comprises an extensible framework that permits messages to be provided to different channel destinations (e.g., using customization scripting such as Javascript). This permits new channels to be implemented far more quickly since an entirely new channel engine architecture does not need to be custom designed for the new channel. Instead, a generic channel engine can be implemented for messages to the common gateway, which are then provided in a customizable manner to the custom channel.

Further details regarding general approaches to implementation of a common gateway are described in U.S. application Ser. No. 14/798,268, titled "COMMUNICATION GATEWAY SERVICES IN A NETWORKED MESSAGE DISTRIBUTION SYSTEM" filed on Jul. 13, 2015, which is hereby incorporated by reference in its entirety.

The program stage manager 163 executes a business process workflow for any number of work items. Each workflow may have a number of different stages. In one embodiment, a stage is an abstract class that represents a component within the business process workflow. Examples of stages include an email campaign stage, a short message service (SMS) campaign stage, an elapsed timer stage, a gateway (or "switch") stage, or any other technically feasible type of stage. In some embodiments, different business logic may be associated with each of the different types of stages.

An event manager mechanism is employed to manage events in the system. For example, once the messages are sent, an "event" is generated that is managed by the event manager. After the messages are sent, interactions may occur from various sources. For example, interactions may occur with the web world, where the user receives the message and takes some sort of action (e.g., causing an event from publishing servers, web API servers, Bounce servers, or cookie servers). For instance, when a target receives an email from the campaign, that target may open up the email and then reply to a message, open a website, etc., which then causes the web services to take an action to generate a new trackable event in the system. The event manager therefore acts as a "listener" for the new events. A queue is maintained of the events in the system, with an event database to hold data pertaining to the events. One or more processing nodes/engines may be used to handle the events in the system.

The events may result in reporting of the event data (e.g., using reporting tools 180) to online analytical processing (OLAP) systems. In addition, the event data can be stored into one or more data warehouses. From the data warehouse, data can be sent back to the customer database (e.g., to update the customer data for use in future campaigns). A server—referred to herein as a "connect server"—can be used to pass data to/from the customer database. In some embodiments, the connect server performs extract, transform, load (ETL) processes to send data to/from the customer database. Data can also be sent to/from partner databases.

Some embodiments are implemented using an IDDP, which includes a set of execution platforms to implement program and campaign execution to very effective levels of predictability, performance, availability, and scalability.

Further details of an example architecture for generating personalization messages are provided in U.S. application Ser. No. 14/798,293, entitled AGE-BASED POLICIES FOR DETERMINING DATABASE CACHE HITS, filed on Jul. 13, 2015, which is hereby incorporated by reference in its entirety.

As shown, one or more campaign specification engines (e.g., email campaign specification engine $164_1$, mobile campaign specification engine $164_2$, social campaign specification engine $164_3$, display campaign specification engine $164_4$, web campaign specification engine $164_5$, etc.) are used to design and implement the marketing campaigns. These campaign specification engines can be implemented, for example, as design applications running on computing systems that are configurable to support the design of campaigns tailored for specific channels and/or specific mediums. Such channels and/or mediums include, for example, email, mobile applications, social media, web outlets, and various types of displays. A marketing person or campaign designer can use the design application to design the content to appear in the email campaign (e.g., text, images, video, etc.), which can then be stored into one or more databases (e.g., customer database $168_1$, customer database $168_2$, customer database $168_3$, etc.). In one embodiment, the design applications are provided to allow the user to visually design, manage, and automate a multistage marketing program. In some cases, design applications implement drag-and-drop user interfaces. A library of prebuilt program templates can be provided in one or more databases.

In addition to design of content, a campaign designer may design a business workflow for a respective campaign. A business process management engine or workflow engine (e.g., program engine 161) can be used to implement the business execution actions or workflows for the campaign. The campaign marketer may further provide target lists and/or other data pertaining to the individuals to whom a marketing campaign is targeted. The aforementioned target lists and/or other data may include, for example, lists of customers as well as instructions to identify the subsets of the customer lists that should be the targets of personalized messages during the course of prosecution of the campaign. The customer databases 168 may therefore include relational data pertaining to customers.

Additional components of the marketing program system are configurable to publish campaign data to various components of the system. For example, data publisher modules 165 (e.g., data publisher $165_1$, data publisher $165_2$, data publisher $165_3$, . . . data publisher $165_N$) serve to publish data from the customer database to storage structures that hold the campaign and personalization data for access by the execution environment. A data delivery platform is provided to hold the campaign and personalization data. Such campaign and personalization data can be managed by an interact data delivery platform 166. Also, campaign and personalization data can be stored in one or more data caches, and such data caches can access one or more data repositories such as the shown interact data repository 167.

The marketing program system 1C00 comprises one or more servers that perform business processing pertaining to the marketing campaigns. In this SaaS architecture any of the shown servers may be used to service marketing campaigns for one or more customers. In some embodiments, the execution environment comprises an independent execution environment that is isolated from design and data management. The independent execution environment uses an in-memory cache of the personalization data that is kept in sync with the master data that is located in the design environment.

In exemplary embodiments, a generic gateway 114 may be provided to handle personalized messages $112_1$ pertaining to marketing campaigns. For example, one or more instances of a program stage manager 163 can be employed. A program stage manager 163 might include a channel engine 160 to direct the flow of messages when prosecuting a marketing campaign. The channel engine entity (e.g., a process or thread) manages the work placed into a queue for processing by various personalization engines (PEs), possibly in conjunction with web services 173 (e.g., see flow control signals $113_1$). An interactive template engine (ITE) can be employed by the personalization engine to perform the message personalization. The personalized messages are then sent to a gateway (e.g., the generic gateway 114, as shown) to be processed for transmission to the campaign targets, possibly using external communication partner's systems (see personalized messages $112_2$ and flow control signals $113_2$).

In some embodiments, different types of engines may be provided to handle the different channels/types of marketing campaigns to be executed. For example, for an email campaign, one or more email channel engines can be employed. An email channel engine might include a program stage manager to manage the specifics of handling personalized emails. For example, personalized emails can be sent to a generic gateway that has been configured as an email gateway to be processed for transmission to the campaign targets.

The personalization engine executes a business process workflow for any number of work items. Each workflow may have a number of different stages. In one embodiment, a stage is implemented as an abstract class that represents a component within the business process workflow. Examples of stages include an email campaign stage, a short message service (SMS) campaign stage, an elapsed timer campaign stage, a gateway (or "switch") campaign stage, or any other campaign stage. In some embodiments, different business logic may be associated with each of the different types of workflows or stages.

In some embodiments, a stage may include multiple "states" within the stage, and the multiple states can be described by a state transition diagram. A group of work items can be input into a given the stage. For example, a stage can include a ready state, a pending state, an executing state, a blocked state, a timer waiting state, and a disposable state. At the ready state, the group of work items is ready for execution of the stage. When a group of work items is initially created and the stage is the first stage of the business process workflow, the group is in a ready state. When an entire group of work items moves from a previous stage to a current stage together, the group is in a ready state. At the pending state, the stage is buffering membership and is not ready for execution. Once the previous stage has completed executing, the state of the group transitions to the ready state. At the executing state, the stage is executing on the group of work items. At the blocked state, the group of work items has failed execution, e.g., an error has occurred. After the executing state is complete, if additional stages exist in the business process workflow, then the group state transitions to the "ready state" for the next stage of the business process workflow. If no additional stages exist, then the group state transitions to the disposable state. A group of work items becomes disposable when the stage is the last stage of the business process workflow or when there are no subsequent stages. A "garbage collection" process can be scheduled to perform garbage collection at a low load time and can delete the group membership and group for this stage. The timer waiting state is associated with a stage that is an "elapsed time" stage having a future expiration date.

Further details regarding general approaches interfacing with a short message service provider are described in U.S. application Ser. No. 14/564,658, titled "COMMON AGGREGATOR FRAMEWORK FOR SMS AGGREGATORS" filed on Dec. 9, 2014, which is hereby incorporated by reference in its entirety.

Further details regarding an approach to implement business workflows are described in U.S. application Ser. No. 12/985,269, titled "SYSTEM AND METHOD FOR EXECUTING A BUSINESS PROCESS WORKFLOW", filed on Jan. 5, 2011, which is hereby incorporated by reference in its entirety.

An event manager mechanism (e.g., event processing engine 171) is employed to manage events in the system. For example, once the messages are sent by a gateway, an "event" is generated that is managed by the event processing engine. After the messages are sent, interactions may occur from various sources. For example, interactions may occur within the online world such as when a receiver of an email message takes some sort of action, which action causes a next event. Such actions and/or events that are caused by the actions can be processed by various web services. Such web services can comprise, but are not limited to, publishing servers 174, and/or bounce servers 175, and/or cookie servers 176, and/or web API servers 177. Strictly as an example, when a targeted recipient receives an email from the campaign, that targeted recipient may open the email and then take an action such as (1) reply to the message, (2) navigate to a website, (3) fill out a form, etc., any of which actions then cause a corresponding component from among the web services to generate a new event and to communicate aspects of that event to the event processing engine 171 in the system. The event manager therefore acts as a "listener" for the new events. A queue is maintained of the events in the system, with an event database to hold data pertaining to the events. One or more processing engines may be used to handle the events in the system.

The events may result in reporting of the event data such as through use of reporting tools and/or through use of online analytical processing 179 (OLAP) systems. In addition, the event data can be stored into one or more data warehouses 178. From the data warehouses, data can be sent back to the customer database (e.g., so as to update the customer data for use in future campaigns). Servers such as the shown connect servers 170 can be used to pass data to and from the customer database. In some embodiments, the connect server receives data from partner and/or customer clouds (e.g., cloud $172_1$, cloud $172_2$, etc.) and performs extract, transform and load processing (ETL processing) before sending data to the customer database. Data can also be sent to/from partners' and customers' databases using any known-in-the-art technology.

Returning again to the discussion of the program stage manager 163, such a program stage manager can process any forms of control-flow semantics (e.g., static data item campaign semantics 116, real-time data item campaign semantics 118, marketing program execution phase semantics 120, etc.). Furthermore, the concurrency inherent in the aforementioned architecture provide the means for managing a multi-arm campaign prosecution flow using parameterizable flow control structures.

FIG. 2 exemplifies a multi-arm campaign prosecution flow 200 that implements components for controlling real-time execution of internet communication campaigns with parameterizable flow control structures. As an option, one or more variations of multi-arm campaign prosecution flow 200 or any aspect thereof may be implemented in the context of the architecture and functionality of the embodiments described herein. Also, the multi-arm campaign prosecution flow 200 or any aspect thereof may be implemented in any environment.

Efficient Workflow Execution

The aforementioned marketing program system 1C00 provides a platform for executing a business process workflow for a large number of work items, including complex multi-arm campaign prosecution workflows, yet using a relatively small amount of resources per flow. For example, work items that share the same workflow states, which may number in the millions or even billions, can be grouped together. Transitions between states are managed by a single change to a record associated with the group. Transitions between states can be captured using a state transition diagram (e.g., to capture a flow such as the shown multi-arm campaign prosecution flow 200).

In one embodiment, a BPM engine allows a user to visually design, manage, and automate a multistage lifecycle program through a drag-and-drop user interface and a library of prebuilt program templates to implement a flow. As shown in FIG. 2, the multi-arm campaign prosecution flow 200 begins with a first action (e.g., at a particular beginning point of execution of the flow) that comprises a "Welcome Campaign" stage. In one embodiment, a stage is an abstract class that represents a component within the multi-arm campaign prosecution flow 200. Examples of stages include an email campaign stage, an SMS (short message service) campaign stage, an elapsed timer stage, a gateway (or "switch") stage, or any other technically feasible type of stage. In some embodiments, different business logic may be associated with each of the different types of stages.

The input to the welcome campaign stage 202 comprises a plurality of work items, also referred to as "process instances" or "enactments." Initially, each of the work items is grouped together in a single group of work items. In the specific example shown in FIG. 2, each work item represents a different user to whom the marketing campaign is targeted. At the welcome campaign stage 202, each work item in the group receives a welcome email. The number of work items may be quite large, possibly on the order of millions or billions of work items. In some embodiments, a data delivery platform can be employed for sending mass emails to a large number of recipients.

In some embodiments, a stage, such as the welcome campaign stage 202 included in the multi-arm campaign prosecution flow 200 may include multiple "states" within the stage connected with a state transition diagram.

Referring again to the welcome campaign stage 202, the next element in the business process workflow after the welcome campaign stage 202 is gate 204, also referred to as a "switch" or "stage gate". At gate 204, the group of work items that is input into the gate is divided into subgroups based on filters corresponding to one or more output paths of the gate. For example, a first filter may filter out those work items (e.g., recipients) associated with an attribute "gender equal to male" and an "age greater than or equal to 40 years old" (see top path 220). A second filter may filter out those work items associated with an attribute of "gender equal to female" (see middle path 222). Work items that do not satisfy either the first or second filters would then constitute the group of male users under age 40, and would proceed to the path labeled "other" (see bottom path 224). In one embodiment, the gate 204 is configured so that certain filters have priority over other filters, and a work item is grouped with other work items based on the highest priority filter that the work item satisfies. In other words, the gate 204 functions like an "if-then-else" statement that executes alternatives in a prioritized order.

In the example shown, the group of work items that satisfies the first filter is passed along top path 220 to wait stage $206_1$. The group of work items that satisfies the second filter is passed along middle path 222 to wait stage $206_2$. The remaining group of work items is passed along bottom path 224 to wait stage $206_3$.

Any wait stage may be configured to respect a wait state for a predetermined period of time (e.g., 1 day, 7 days, 30 days, etc.) before the first subgroup is passed to an onward stage in the workflow. Once the predetermined period of time has elapsed, the first subgroup transitions to the email campaign stage $208_1$. At the email campaign stage $208_1$, an email, such as a marketing email, can be sent to the recipients in the first subgroup. At the SMS campaign stage $210_1$, an SMS, such as a marketing SMS, can be sent to the recipients in the first subgroup.

When the second subgroup of work items that satisfies the filter associated with its respective path is satisfied, execution for that arm is passed to the wait stage $206_2$. The wait stage $206_2$ is associated with waiting for a predetermined period of time before the second subgroup is passed to the next stage in the workflow, namely the stage labeled email campaign stage $208_2$. The expiration time of the wait stage $206_2$ can be the same or different as the expiration time of the wait stage $206_1$. At the email campaign stage $208_2$, an email, such as a marketing email, can be sent to the recipients in the second subgroup. The email that is sent in conjunction with the email campaign stage $208_2$, associated with second subgroup, can be the same or different as the email that is sent in conjunction with the email campaign stage $208_1$ associated with first subgroup.

The third subgroup of work items is passed to the wait stage $206_3$. The wait stage $206_3$ is associated with waiting for a predetermined period of time before the third subgroup is passed to the next stage in the workflow. The expiration time of the wait stage $206_3$ can be the same or different as the expiration time of the wait stages $206_1$ and/or $206_2$. Once the requisite time has passed, the second subgroup transitions to the SMS campaign stage $210_2$. At the SMS campaign stage $210_2$, an SMS, such as a marketing SMS, can be sent to the recipients in the third subgroup.

The example business process workflows discussed herein are merely exemplary and many other business process workflows are also within the scope of various embodiments. For example, some business process workflows could include branching stages that divide a group into subgroups (e.g., by defining merging stages that merge two subgroups into a larger group), loops, or any other technically feasible architecture.

As aforementioned, any of the multiple paths, or any stages, arms, segments, or any substages, subarms, subsegments or subgroups associated with any path can be executed concurrently.

FIG. 3 depicts real-time processing during processing of concurrent campaign prosecution paths 300 taken during prosecution of marketing campaign programs with parameterizable flow control structures. As an option, one or more variations of concurrent campaign prosecution paths 300 or any aspect thereof may be implemented in the context of the architecture and functionality of the embodiments described herein. Also, the concurrent campaign prosecution paths 300 or any aspect thereof may be implemented in any environment.

As shown, an input (e.g., a group of work items) initiates activities within the concurrent campaign prosecution paths. In the embodiment shown, the system includes a ready state 302, a pending state 304, an executing state 306, a blocked state 308, a timer_waiting state 310, and a disposable state 312. Additionally a campaign continuation decision 314 is used to determine if there are additional stages or campaign prosecution paths to be processed.

At the ready state 302, the group of work items is deemed to be ready for execution within a campaign. When a group of work items is initially created and input, the processing of the group becomes ready to move to ready state 302.

At the pending state 304, the concurrent campaign prosecution state machine is buffering membership and is not ready for execution. As an example, assume that the previous stage was an SMS campaign stage, and further assume that in such an SMS campaign stage, SMS messages are sent synchronously one at a time to each recipient in the group. As SMS messages are sent, the recipients that receive a successful transmission are moved to the pending state 304. Once the previous stage has completed executing (e.g., all of the recipients in the previous stage have received a successful SMS transmission), the state of the group transitions to the ready state 302.

While in the executing state 306, the state machine is in the state of processing on the group of work items. For example, in an email campaign stage, the executing state 306 is associated with sending emails to each recipient in the group, and in an SMS campaign stage, the executing state 306 is associated with sending SMS messages to each recipient in the group.

At the blocked state 308, the group of work items has interrupted or failed execution (e.g., an error has occurred). Some embodiments invoke a manager or an administrator or other technical support to cure the error and/or to manually relaunch or retry a blocked campaign (see manual mode, FIG. 5A infra). Specifically, release from a blocked state may invoke processes for re-evaluating the stage gate expression upon transition out of a blocked state.

After the executing state 306 is complete, if additional stages exist in the business process workflow, then the group state transitions to the "ready state" for the next stage of the business process workflow. If no additional stages exist, then the group state transitions to the disposable state 312, and resources are released. A group of work items becomes disposable when the state machine is the last stage of the business process workflow or when there are no subsequent stages. A garbage collection process can be scheduled to perform garbage collection at a low load time and can delete the group membership storage and group identifier storage.

The timer_waiting state 310 is associated with a state machine that is in an "elapsed time" state, where the timer has a future expiration date. For example, the state machine may be associated with a timer that causes a wait time of 30 days to pass before proceeding to the next stage of the business process workflow. When the expiration time has passed, the group state transitions to the "ready state" for the next stage of the business process workflow.

Although the state machine described in FIG. 3 is shown as having particular states and state transitions, many other implementations of the state machine are also within the scope of the embodiments that are herein-disclosed. For example, the state machine can include different states, different transitions between states, or can be implemented in any technically feasible manner, which may not include states.

To implement the state machine described in FIG. 3, multiple processors operating concurrently can be deployed. Moreover some of the states of the state machine described in FIG. 3 can be implemented in a server.

Figure 4:
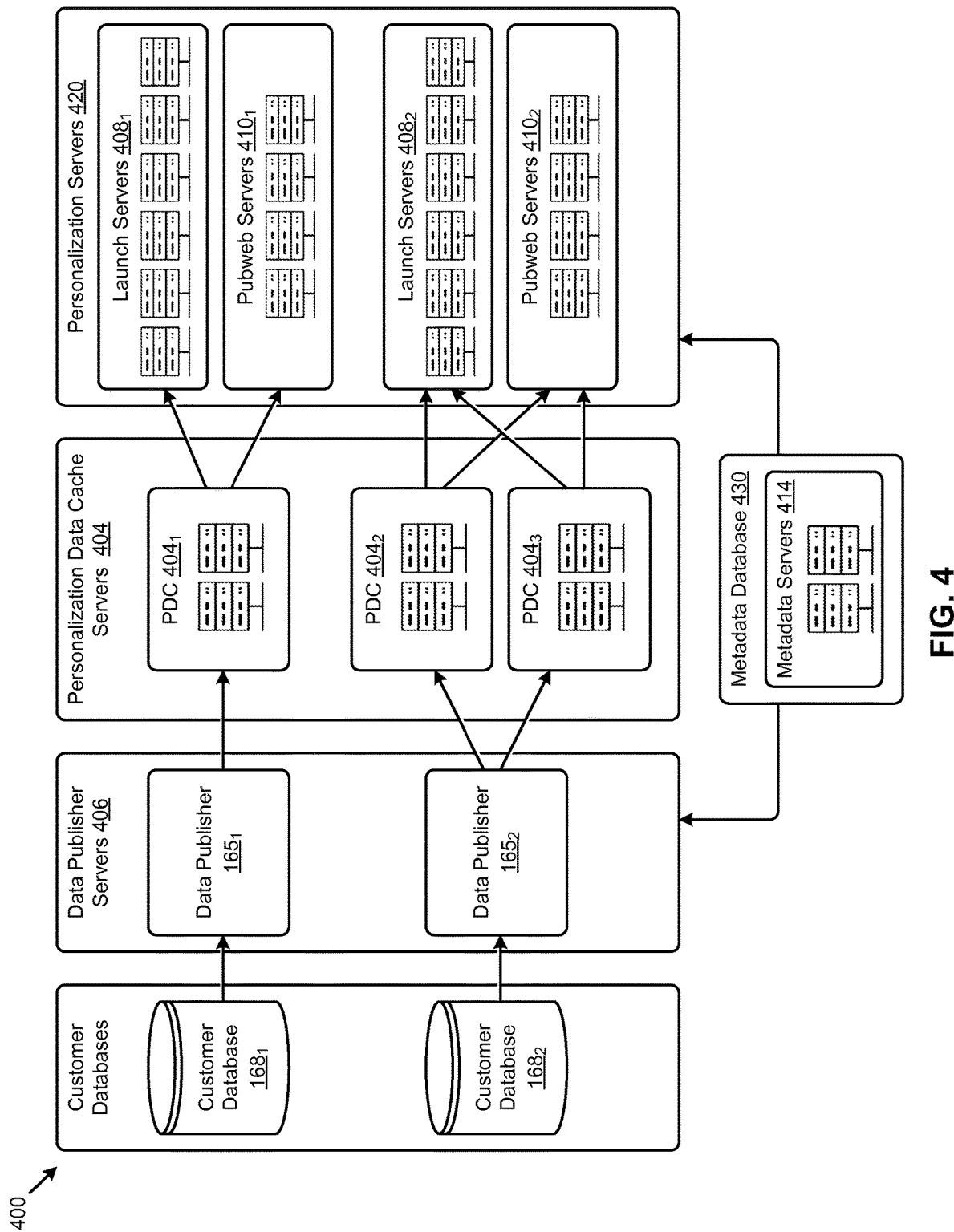
FIG. 4 depicts a multi-server instance of a real-time processing system used for controlling real-time execution of internet communication campaigns with parameterizable flow control structures, according to an embodiment.

FIG. 4 depicts a multi-server instance of a real-time processing system 400 as used for controlling real-time execution of internet communication campaigns with parameterizable flow control structures. As an option, one or more variations of the real-time processing system 400 or any aspect thereof may be implemented in the context of the architecture and functionality of the embodiments described herein. Also, the real-time processing system 400 or any aspect thereof may be implemented in any environment.

One possible logical partitioning of a real-time processing system is illustrated in FIG. 1C, and an example physical partitioning of such a real-time processing system is illustrated in this FIG. 4. The real-time processing system 400 depicts a physical partitioning of a multi-tenant SaaS platform that can be used to deliver highly personalized messages (promotional and transactional) in any digital channel including email, mobile, web, display, and social channels. Here, there may be multiple customers having individual databases (e.g., customer database $168_1$, customer database $168_2$). The data publisher server 406 publish customer data to the personalization data cache servers 404 (e.g., PDC $404_1$, PDC $404_2$, PDC $404_3$) which may be organized as high availability pairs (e.g., PDC $404_2$, PDC $404_3$), as shown.

The personalization servers 420 perform the required personalizations of the marketing content. Any personalization server might include one or more launch servers (e.g., launch servers $408_1$, launch servers $408_2$) and one or more publication servers (e.g., pubweb servers $410_1$, pubweb servers $410_2$). Any server anywhere and/or in any collection of servers can access the metadata database 430, which may be implemented using one or more metadata servers 414.

The shown pubweb servers process web requests that originate from uniform resource locators (URLs) that are sent as embedded links in personalized messages (e.g., HTTP links in a personalized email message). When an end user who receives a personalized message clicks on an embedded link, the link target resolves to a pubweb server, and the content corresponding to the link is provided to the user's browser or web agent for rendering. Pubweb servers can generate events with information pertaining the users who accessed the personalized link(s). This enables tracking of end users activities which in turn facilitates marketing campaign flow decisions based on user activity. Certain parameterizable flow control structures can control execution through a marketing campaign based on specific user activity or based on aggregation of measured user activities. The shown mapping of functions to structures is purely exemplary, and other mappings or variations are possible.

FIG. 5A depicts a marketing program flow 5A00 showing portions of a program design phase and portions of a program execution phase for designing and executing marketing campaign programs using parameterizable flow control structures. As an option, one or more variations of marketing program flow 5A00 or any aspect thereof may be implemented in the context of the architecture and functionality of the embodiments described herein. Also, the marketing program flow 5A00 or any aspect thereof may be implemented in any environment.

Program Stage Gates

Embodiments provide a technique for executing a business process workflow using a gate component that embody high-order semantics for program stage and flow control. A stage gate test mechanism provides a way to capture and deploy a switch that permits orchestration of a workflow based upon evaluated values such as, for example, numbers and time parameters. The new gateway mechanism (referred to herein as a "stage gate") implements a switch that can operate using one or more variables and/or constants and/or other parameters or stage gate expressions therefrom. The one or more variables and/or constants is evaluated to determine the operation of the switch.

A program stage gate can be used in a program design phase 502 (e.g., during a capture session) and can be deployed for evaluation during a program execution phase 504. As shown, operations within the marketing program flow 5A00 include a step to insert a stage gate into a workflow (see step 506), a step to configure state gate parameters (see operation 508), a step to initiate execution of the captured workflow (see operation 510), and a step to evaluate data in real-time during progression through the workflow (see step 512). Specifically, step 512 evaluates data within the workflow, and step 513 determines if and when the conditions are present for entry to the stage gate (e.g., by performing real-time condition tests), at which point in time stage gate condition tests are performed.

The shown stage gate condition tests 514 resolve to one of three paths: (1) take the path labeled ConditionA when the stage gate expression associated with ConditionA is TRUE (e.g., see step 516), or (2) take the path labeled ConditionB (see step 520) when the stage gate expression associated with ConditionA does not evaluate to TRUE. In some situations, the variables needed for evaluation of the associated stage gate expression are not immediately available, in which case progression pends at the point of stage gate condition tests 514 awaiting availability of the variables needed for evaluation of the associated stage gate expression. If the variables needed for evaluation of the associated stage gate expression do not arrive within a specified timeout period, then the gate passes to a timeout operation (see step 518). In some cases the function of the timeout operation includes calling a method or subroutine and, in some cases, the function of a timeout operation can include halting execution of the marketing campaign and then entering a manual mode that elicits administrative intervention.

Program flow design can include any of a variety of stage gates, a selection of which are disclosed hereunder, and any paths can be defined to be traversed based on the evaluation of such a stage gate. One possible technique for capturing a program flow is shown and discussed as pertains to FIG. 5B.

Figure 5B:
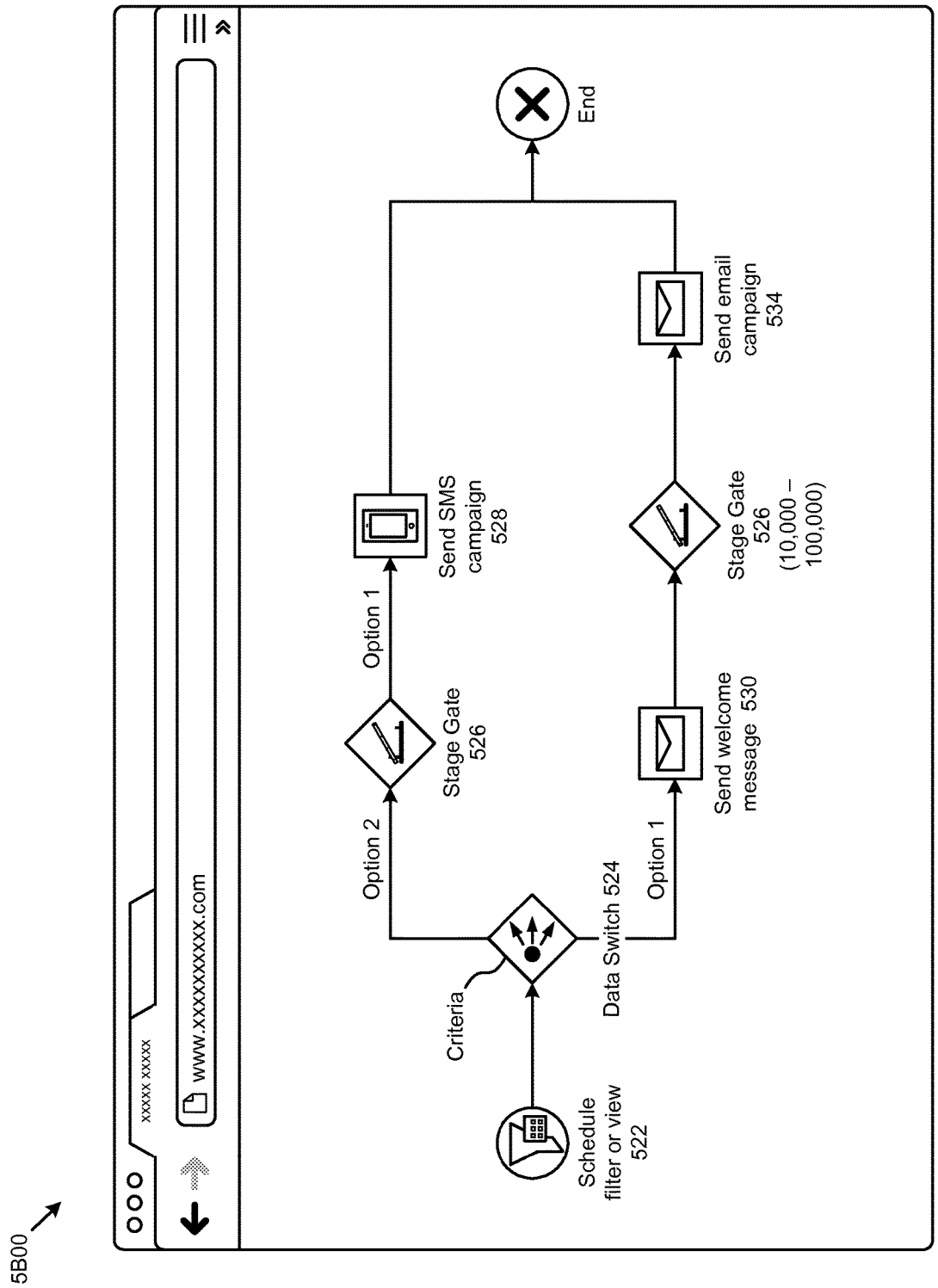
FIG. 5B presents a program flow design tool user interface for capturing marketing campaign program flow schematics that use parameterizable flow control structures, according to an embodiment.

FIG. 5B presents a program flow design tool user interface 5B00 for capturing marketing campaign program flow schematics that use parameterizable flow control structures. As an option, one or more variations of program flow design tool user interface 5B00 or any aspect thereof may be implemented in the context of the architecture and functionality of the embodiments described herein. Also, the program flow design tool user interface 5B00 or any aspect thereof may be implemented in any environment.

FIG. 5B depicts a schematic capture approach to implement step-wise stage gates in a program flow. The capture process begins by opening a canvas to define a workflow, then inserting and configuring operational icons into the workflow. Operational icons can include (1) a filter icon 522 to schedule a filtering operation; (2) a data switch icon 524 (e.g., with criteria for switching on data values); (3) a preconfigured campaign icon (e.g., welcome message icon 530, SMS campaign icon 528, email campaign icon 534); (4) a stage gate icon 526; and/or other icons.

The shown stage gate icon 526 can be configured with parameters corresponding to real-time test conditions (e.g., stage gate expressions to be evaluated) for the gate, along with the action to execute if the evaluated stage gate expression is TRUE. As described earlier, this can be performed by launching the program in the execution environment using one or more execution engines.

FIG. 5B is an example of a workflow having a program stage gate. Here, the top portion of the flow pertains to a campaign to send SMS messages and the bottom portion of the flow pertains to a campaign to send email messages. If the marketer seeks to direct the progression of the campaign based in some particular real-time value (e.g., "capping") for the campaign, he/she may wish to engage in the next steps in the campaign only while the number of identified recipients is less than a threshold value. In this case, the stage gate in the top portion of the flow can be configured to functionally switch to execute the SMS campaign only if the number of recipients is below the specified threshold value. This is implemented with a stage gate configured to have a "maximum threshold value" (or in some cases with a "minimum threshold value"). Similarly, the marketer may seek to engage in the email campaign only if the number of identified recipients is within a certain range (e.g., 10,000-100,000 recipients). In this case, the stage gate in the bottom portion of the flow can be configured to functionally switch to execute the email campaign only if the number of recipients is within that specified range.

In such cases, the stage gates would have been configured (e.g., during a program design phase) to include these thresholds expressed as one or more numerical values. During execution, a list of "enactments" (e.g., messages sent) can be maintained to track the progression though an identified list of target recipients for the marketing campaign. A count can be made of these targeted recipients to identify the then-current number of recipients. This identified number of recipients can then be used to evaluate against the threshold parameters value(s) established for the stage gate.

In exemplary uses, if the number of targeted recipients meets or exceeds the threshold value configured for the stage gate, then the gate will switch to perform the identified activity, (e.g., to allow the next campaign actions to be executed). Otherwise, the campaign activity will not be executed. If a stage gate is so configured, an administrator can be notified at this moment in time, and further actions can then be taken such as to close the execution and/or allow for manual actions by the administrator.

Figure 5C:
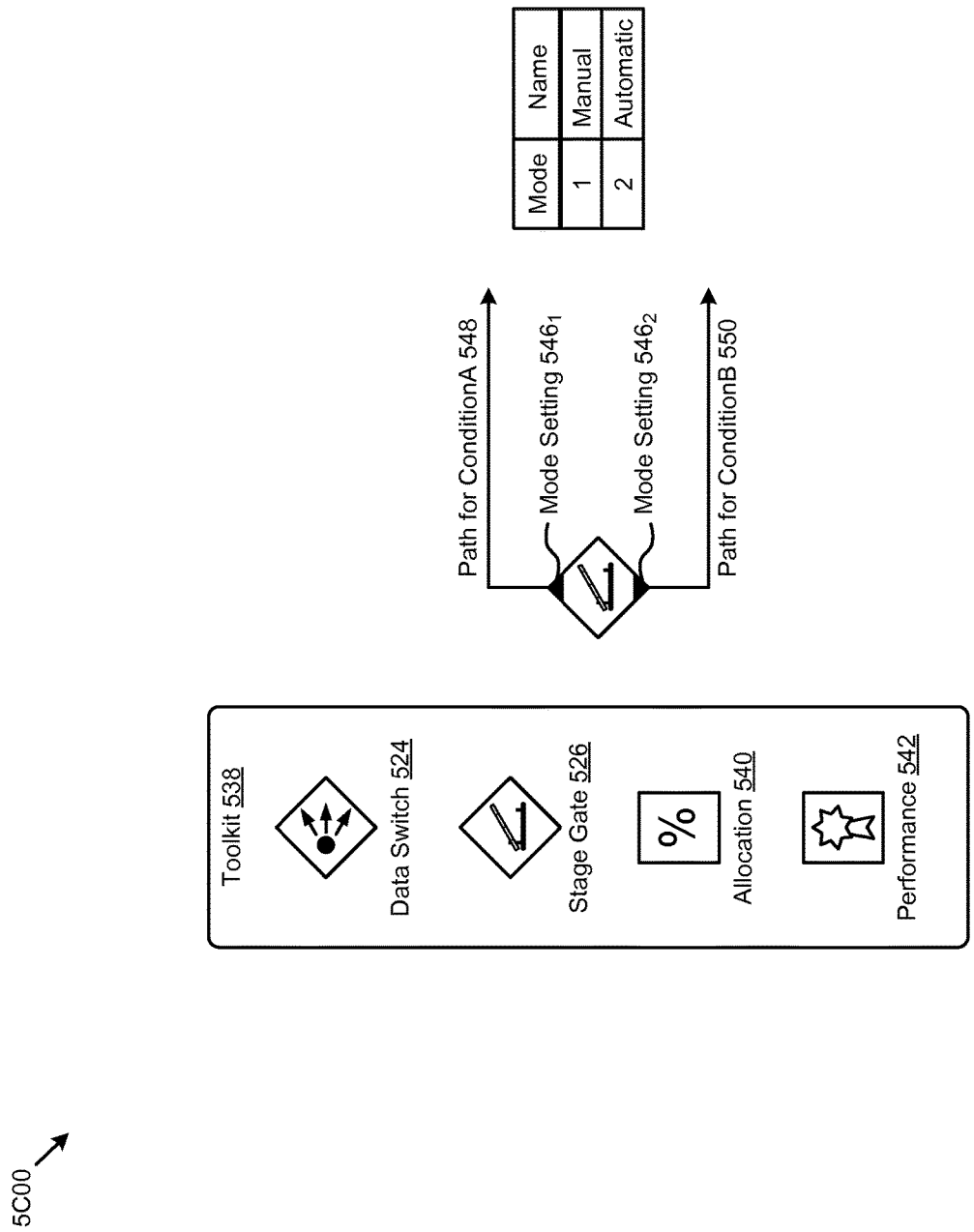
FIG. 5C presents a program flow design tool user interface to implement drag-and-drop mode control settings when designing and capturing marketing campaign program flow schematics that use parameterizable flow control structures, according to an embodiment.

FIG. 5C presents a program flow design tool user interface 5C00 to implement drag-and-drop mode control settings when designing and capturing marketing campaign program flow schematics that use parameterizable flow control structures. As an option, one or more variations of program flow design tool user interface 5C00 or any aspect thereof may be implemented in the context of the architecture and functionality of the embodiments described herein. Also, the program flow design tool user interface 5C00 or any aspect thereof may be implemented in any environment.

A toolkit 538 can be provided to work with a schematic capture tool such as might be included in a program flow design tool user interface 5B00. In addition to the aforementioned data switch icon 524 and the stage gate icon 526, an allocation icon 540 and a performance icon 542 can be provided in the toolkit.

A stage gate icon 526 can be dropped onto a schematic of a workflow, and can be configured for operation by connecting paths associated with specific conditions (e.g., see path for conditionA 548, and see path for ConditionB 550). Further, the vertices of a stage gate icon 526 can be configured to operate in selected modes. As shown, mode control settings (e.g., mode settings $546_1$, and mode setting $546_2$) include a "Manual Mode", and an "Automatic Mode".

In a manual mode operation, the stage gate evaluates the criteria defined for the stage gate, and in case that the criteria is met, the flow takes the indicated path. If the criteria is not met, then the flow is held at the gate and a notification is sent to a program administrator. The program administrator in turn can intervene with various actions (e.g., release the hold, interrupt or halt the campaign, etc.).

In automatic mode operation, the stage gate is configured to route the flow to an indicated path automatically (e.g., without administrative intervention). In some situations one or more program administrators are notified of the automatic progression through the stage gate.

In addition to the processing of the above-described modes, a program stage gate may implement a timeout. A timeout path can be associated with a timeout period, and that path can be taken in the case that criteria for the respective stage gate is not met within the specified timeout period. A timeout path can be configured to correspond to any path (e.g., a "Y" path or an "N" path, or a forward path or an alternative path). A timeout condition (e.g., a finite amount of time) and corresponding path can be specified for a program stage gates in any mode.

Figure 6A:
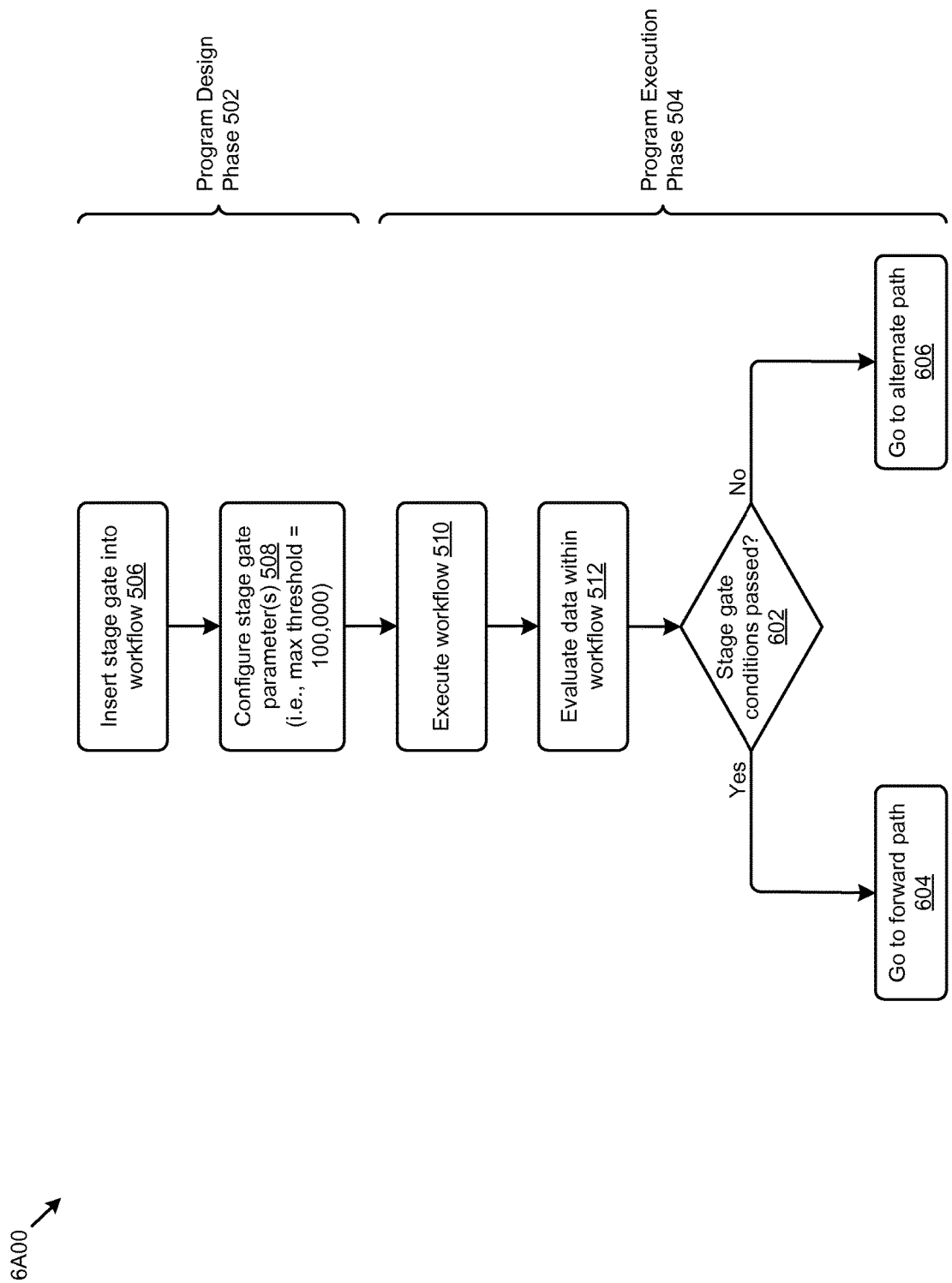
FIG. 6A depicts a marketing program flow having a maximum value condition test to control real-time execution of internet communication programs, according to an embodiment.

FIG. 6A depicts a marketing program flow 6A00 having a maximum value condition test to control real-time execution of internet communication programs. As an option, one or more variations of marketing program flow 6A00 or any aspect thereof may be implemented in the context of the architecture and functionality of the embodiments described herein. Also, the marketing program flow 6A00 or any aspect thereof may be implemented in any environment.

One example use scenario is to allow the setting of a minimum and/or maximum numerical threshold for the stage gate. As shown in FIG. 6A, a stage gate is configured to include a max threshold value of 100,000, where a forward path 604 is automatically executed only if the number of targeted recipients is less than or equal to 100,000 recipients, otherwise the campaign flow will move to the alternate path 606 (e.g., see the "No" branch of stage gate decision 602). This scenario may be created, for example, to provide an operational check and balance to the marketers such as to avoid the situation where an over-budget number of recipients is targeted for a marketing campaign. Such a situation may occur, for example, if the marketer's programmer that designs the SQL for generating the list of targets makes an error that results in a massively excessive number of recipients. If this situation is not caught ahead of time, then the marketing campaign could end up sending out far too many marketing messages, which may result in a very large and unexpectedly expensive campaign (both monetarily and computationally).

Figure 6B:
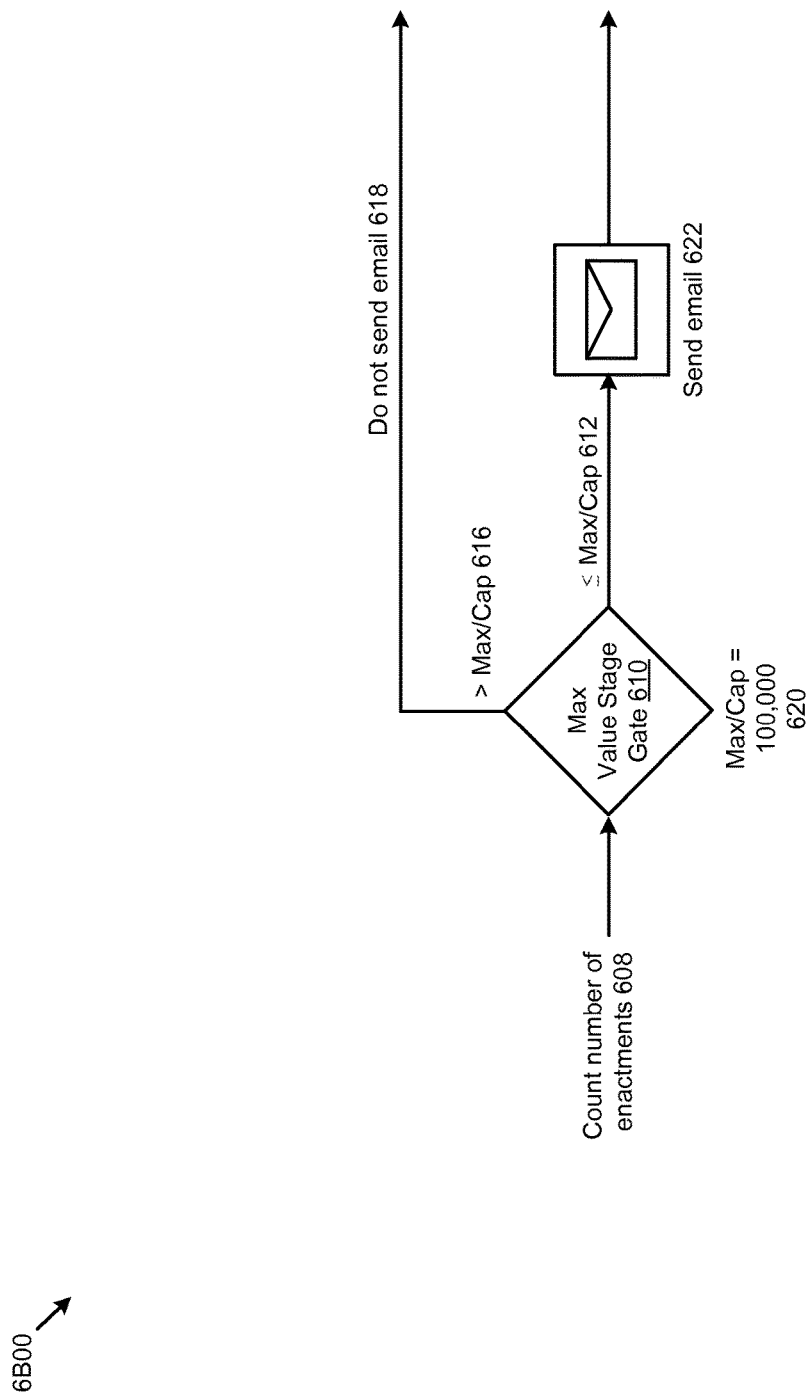
FIG. 6B presents a maximum value stage gate scenario using a drag-and-drop maximum value condition parameterization to control real-time execution of internet communication programs, according to an embodiment.

FIG. 6B presents a maximum value stage gate scenario 6B00 using a drag-and-drop maximum value condition parameterization to control real-time execution of internet communication programs. As an option, one or more variations of maximum value stage gate or any aspect thereof may be implemented in the context of the architecture and functionality of the embodiments described herein. Also, the maximum value stage gate or any aspect thereof may be implemented in any environment.

An icon for a maximum value stage gate 610 is dragged-and-dropped onto a schematic canvas and a count is made of the list of targeted recipients (e.g., count number of enactments 608). The values are assigned (e.g., see max/cap equals expression 620, max/cap greater-than expression 616, and max/cap less-or-equal expression 612) and the paths are attached (e.g., see "send email" campaign path 622, and see the "do not send email" campaign path 618).

Figure 7A:
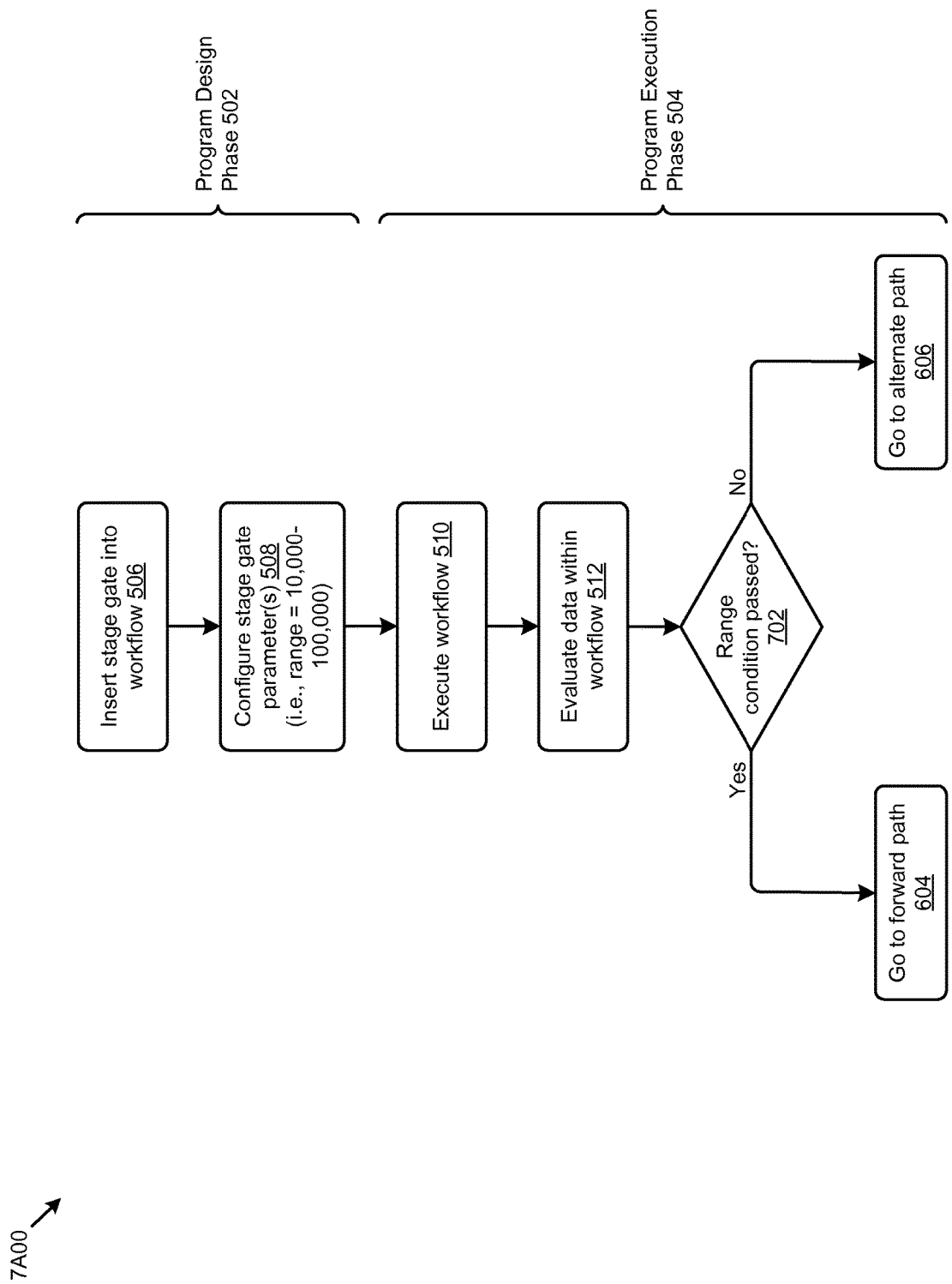
FIG. 7A depicts a marketing program flow having a range condition test to control real-time execution of internet communication programs, according to an embodiment.

FIG. 7A depicts a marketing program flow 7A00 having a range condition test to control real-time execution of internet communication programs. As an option, one or more variations of marketing program flow 7A00 or any aspect thereof may be implemented in the context of the architecture and functionality of the embodiments described herein. Also, the marketing program flow 7A00 or any aspect thereof may be implemented in any environment.

Another example use scenario is to allow the setting of a range of values to be set for the stage gate. FIG. 7A illustrates the scenario where a range of values is configured for the stage gate. Here, as shown, a stage gate is configured to include a range from 10,000 to 100,000, where an email campaign is automatically executed only if the number of targeted recipients is within this range of values. This scenario may be created, for example, to provide execution of a campaign only if a critical mass of recipients is identified (e.g., see range condition 702), yet a max threshold is still imposed to avoid sending out an over-budget number of messages.

A count is made of the list of targeted recipients (e.g., enactments) to determine whether the number of targeted recipients falls within the specified range. As shown, if the count of targeted recipients falls outside the range (e.g., 200,000 recipients), then this is a violation of the range setting for the stage gate, and the range gate expression would not evaluate to TRUE (see range condition stage gate icon 710 of FIG. 7B). As a result, the email campaign is not executed in this situation. On the other hand, if the number of targeted recipients may be determined to be within the specified range (e.g., 50,000 recipients), the situation results in execution of the email marketing campaign for the 50,000 identified recipients.

Figure 7B:
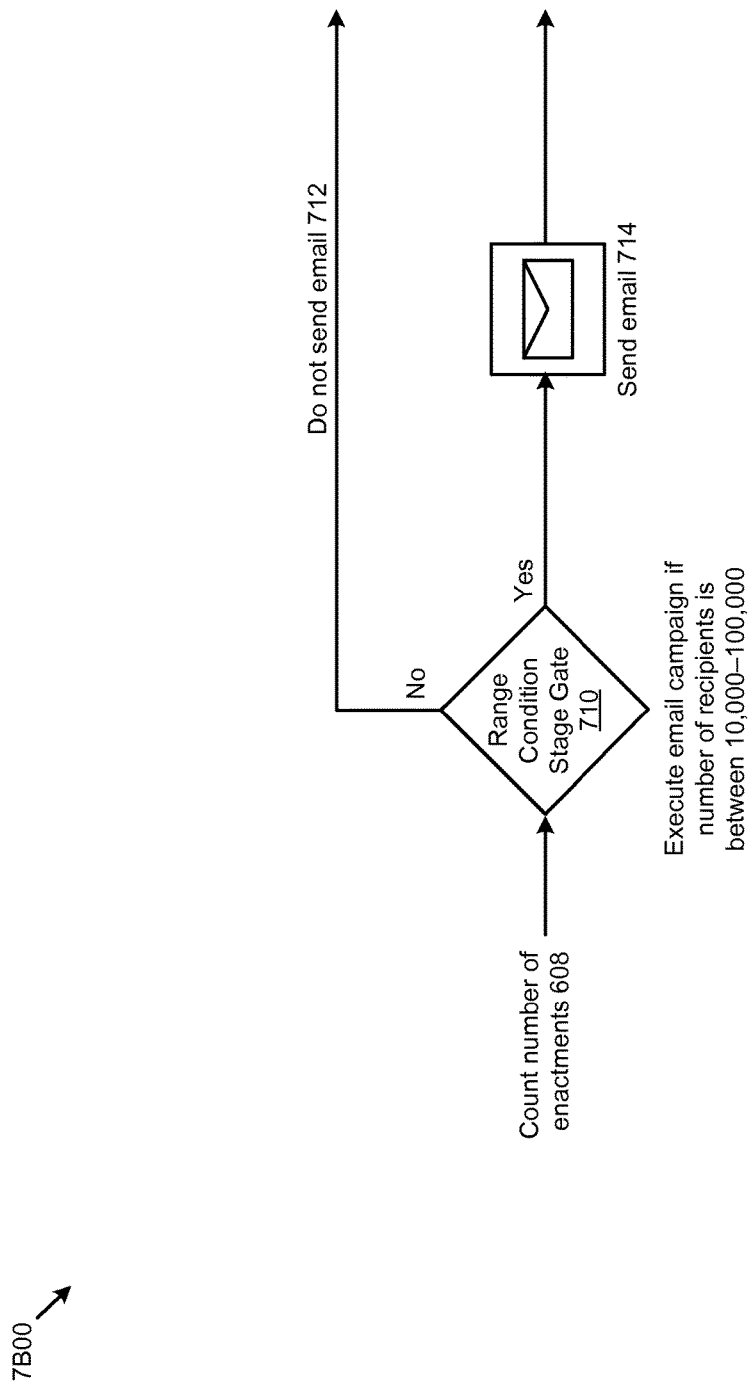
FIG. 7B presents a range condition stage gate scenario using a drag-and-drop range condition parameterization to control real-time execution of internet communication programs, according to an embodiment.

FIG. 7B presents a range condition stage gate scenario 7B00 using a drag-and-drop range condition parameterization to control real-time execution of internet communication programs. As an option, one or more variations of range condition stage gate or any aspect thereof may be implemented in the context of the architecture and functionality of the embodiments described herein. Also, the range condition stage gate or any aspect thereof may be implemented in any environment.

As shown, if the count of targeted recipients falls outside the range, then this is a violation of the range setting for the stage gate, and the range gate expression would not evaluate to TRUE (see range condition stage gate icon 710). As a result, the email campaign is not executed in this situation (see path 712). On the other hand, if the number of targeted recipients may be determined to be within the specified range (e.g., 0-50,000 recipients), then the email marketing campaign would commence for the 50,000 identified recipients (see path 714).

Figure 8A:
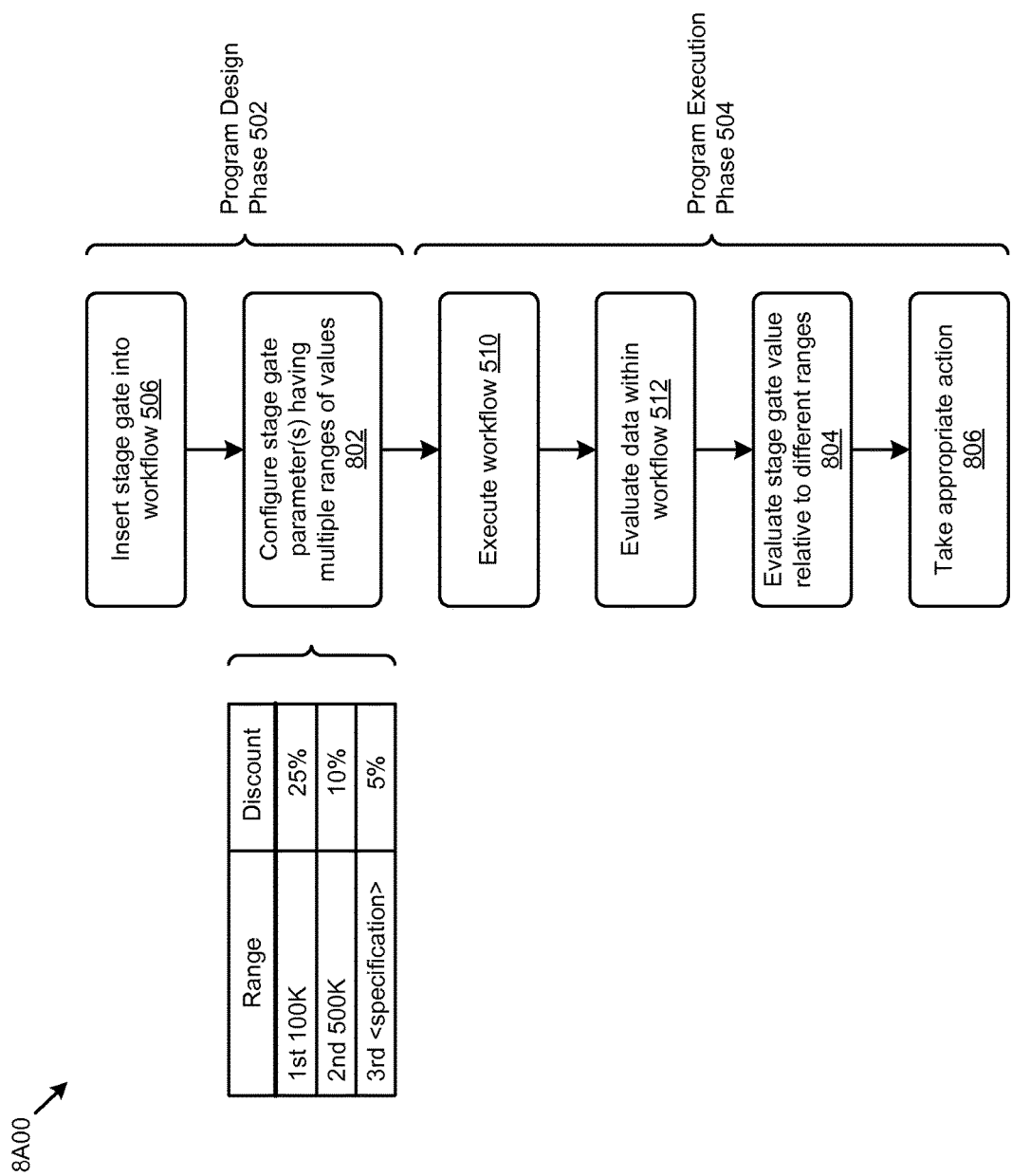
FIG. 8A depicts a marketing program flow having a multiple range condition test to control real-time execution of internet communication programs, according to an embodiment.

FIG. 8A depicts a marketing program flow 8A00 having a multiple range condition test to control real-time execution of internet communication programs. As an option, one or more variations of marketing program flow 8A00 or any aspect thereof may be implemented in the context of the architecture and functionality of the embodiments described herein. Also, the marketing program flow 8A00 or any aspect thereof may be implemented in any environment.

FIG. 8A includes a flowchart of a two-phase approach to design and execute a stage gate involving multiple ranges of values. The process begins by inserting and configuring the inventive stage gate into a workflow. The stage gate is configured with parameters corresponding to the multiple ranges of values, along with the action to execute if the evaluated value falls within the specified range(s) (see step 802). The next step is to execute the workflow. As described earlier, this is performed by launching the program in the execution environment using one or more execution engines. The foregoing illustrates the scenario where multiple stepped actions are configured for the stage gate. Here, as shown, a stage gate is configured to include (a) a first range configuration, where an email campaign is executed to provide a 25% discount for the first set of 100,000 recipients, (b) a second range configuration, where an email campaign is executed to provide a 10% discount for the second set of 500K recipients, and (c) a third range configuration where an email campaign is executed to provide a 5% discount for the third set of recipients.

During the prosecution of the corresponding marketing program flow, a count is made of the list of targeted recipients (e.g., enactments) to determine whether the number of targeted recipients falls within the range of values.

There may be a desire to configure multiple ranges, where each of the ranges results in a different type of evaluation (see step 804) and a different execution action taken (see step 806). This can be implemented, for example, by configuring the stage gate with information for multiple ranges of values. The stage gate will then switch differently depending upon whether the evaluated value at the stage gate falls within the scope of the one or more range of values.

Figure 8B:
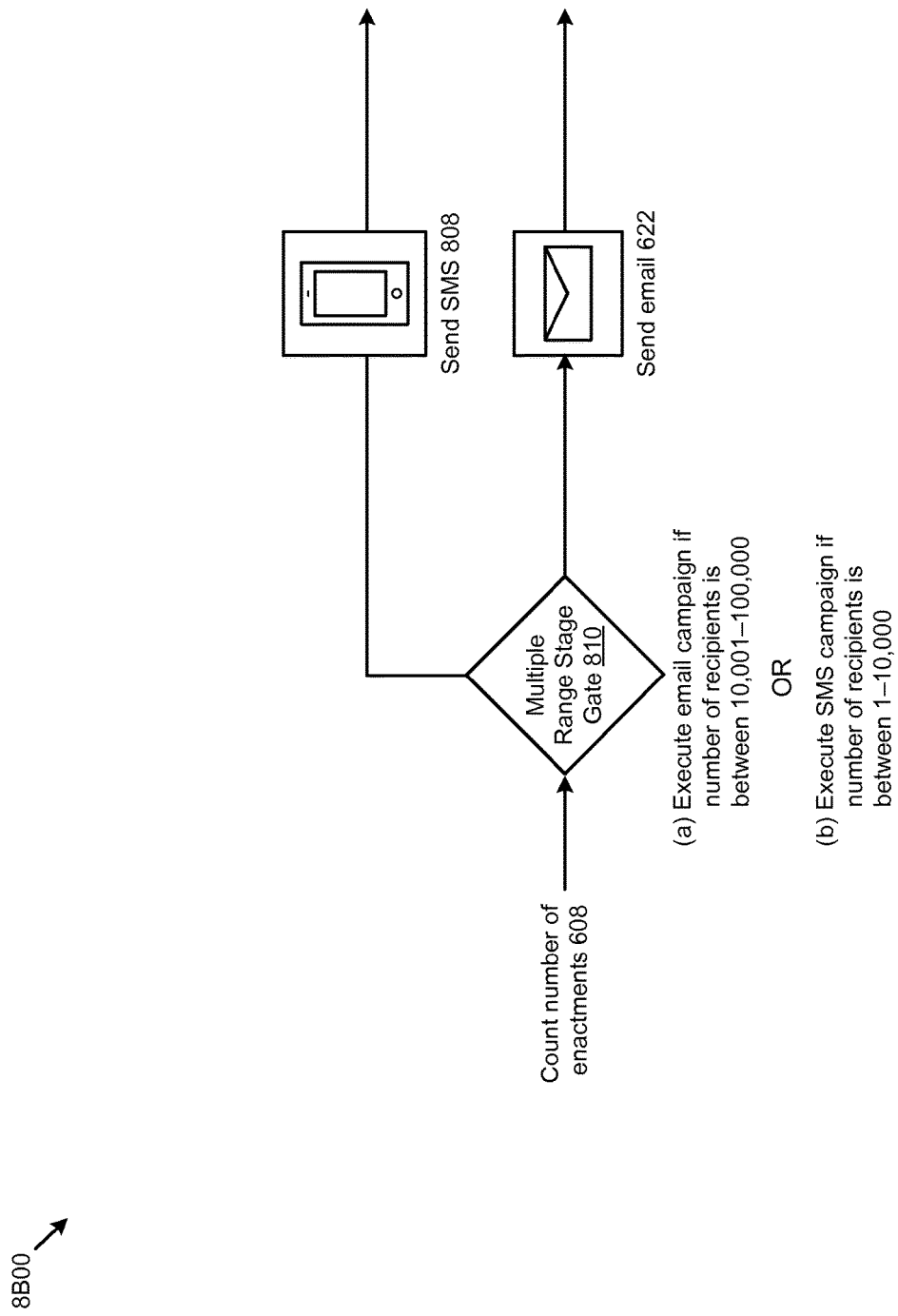
FIG. 8B presents a multiple range stage gate scenario using a drag-and-drop multiple range condition parameterization to control real-time execution of internet communication programs, according to an embodiment.

FIG. 8B presents a multiple range stage gate scenario 8B00 using a drag-and-drop multiple range condition parameterization to control real-time execution of internet communication programs. As an option, one or more variations of multiple range stage gate scenario 8B00 or any aspect thereof may be implemented in the context of the architecture and functionality of the embodiments described herein. Also, the multiple range stage gate scenario 8B00 or any aspect thereof may be implemented in any environment.

If there are any stage gates in the workflow, then the data in the workflow is evaluated against the stage gate during execution to determine whether the appropriate switching functionality should be performed. Here, the multiple range stage gate 810 has been configured to switch upon determinations when the number of identified target recipients of messages fall within a range from a plurality of ranges. During execution, performance of enactments (see count number of enactments 608) against a list of enactments is checked and analyzed to determine the number of targeted recipients for the campaign. This identified number of recipients can then be used to evaluate against the parameters value(s) established for multiple ranges of the stage gate.

The shown stage gate is configured to include (a) a first range from 10,001 to 100,000, where an email campaign path is automatically executed only if the number of targeted recipients is within this range of values. A second range from 1 to 10,000, can be evaluated, and if the number of targeted recipients is within this range of values, an SMS campaign is automatically initiated (see SMS campaign path 808).

Figure 9A:
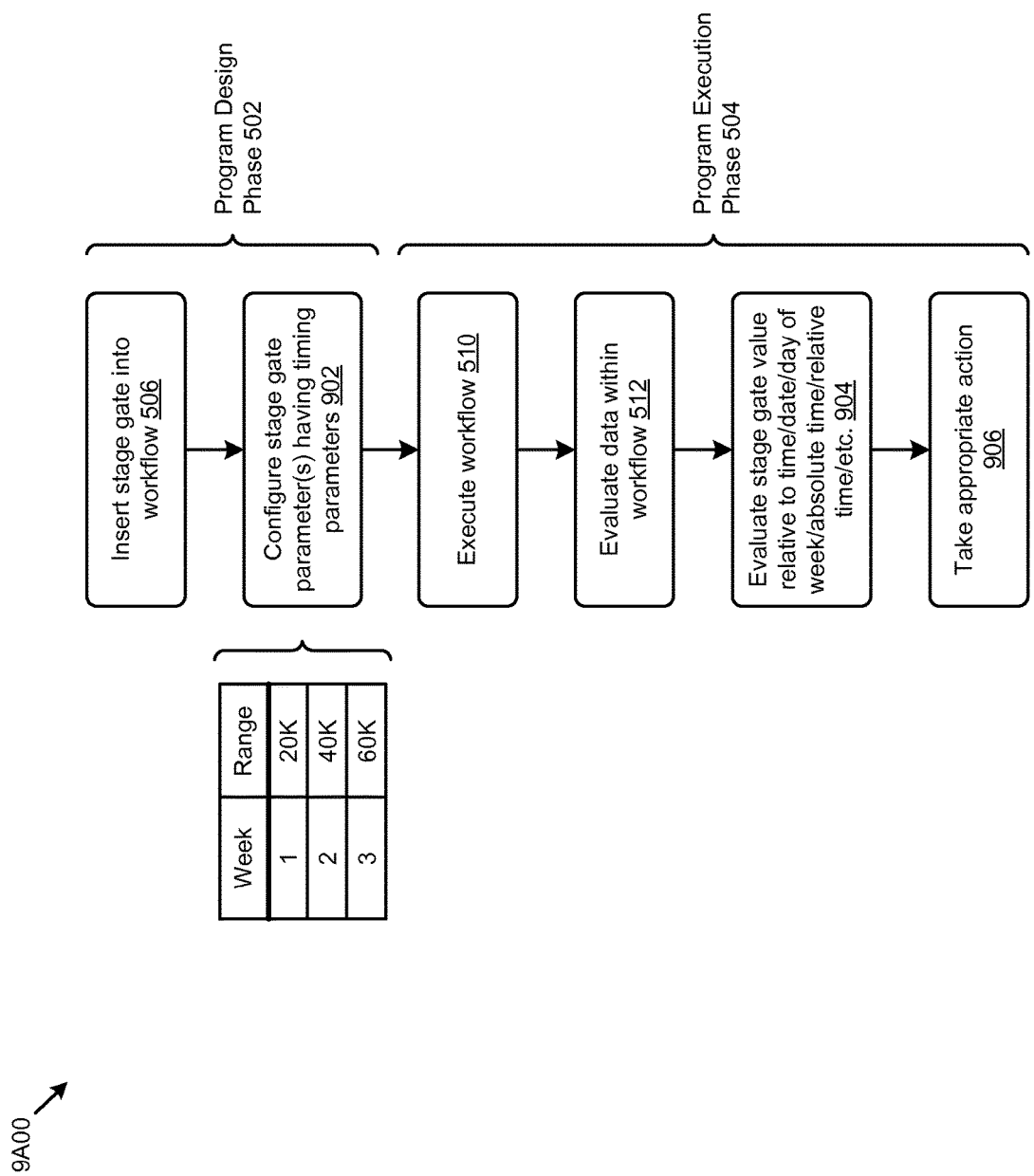
FIG. 9A depicts a marketing program flow having a date and time condition test to control real-time execution of internet communication programs, according to an embodiment.

FIG. 9A depicts a marketing program flow 9A00 having a date and time condition test to control real-time execution of internet communication programs. As an option, one or more variations of marketing program flow 9A00 or any aspect thereof may be implemented in the context of the architecture and functionality of the embodiments described herein. Also, the marketing program flow 9A00 or any aspect thereof may be implemented in any environment.

Yet another stage gate variation pertains to implementation of a timing aspect when evaluating a stage gate. In this variation, the actions to be taken from the stage gate can be based upon stage gate parameters that have one or more timing parameters (see step 902). Examples of such timing parameters may include an absolute time value (e.g., " . . . 10 AM"), a date value (e.g., " . . . July 20"), a day of week (e.g., " . . . on Monday"), a range (e.g., " . . . from July 19 to July 20"), periodic time (e.g., " . . . on weekly basis"), and/or absolute date (e.g., " . . . on Jul. 19, 2014"). Some situations can be described using complex time dimensions and/or rates. For example: "100, 000 enactments per day" or "1,000,000 enactments per week".

As shown, stage gate configuration 904 process begins by inserting the stage gate into a workflow and configuring the stage gate with values corresponding to the timing parameter(s) to take an appropriate path (see step 906). During program execution phase, the appropriate action is invoked when an evaluated value falls within the scope of the specified timing parameters (e.g., when the timing aspect stage gate expression evaluates to TRUE).

Figure 9B:
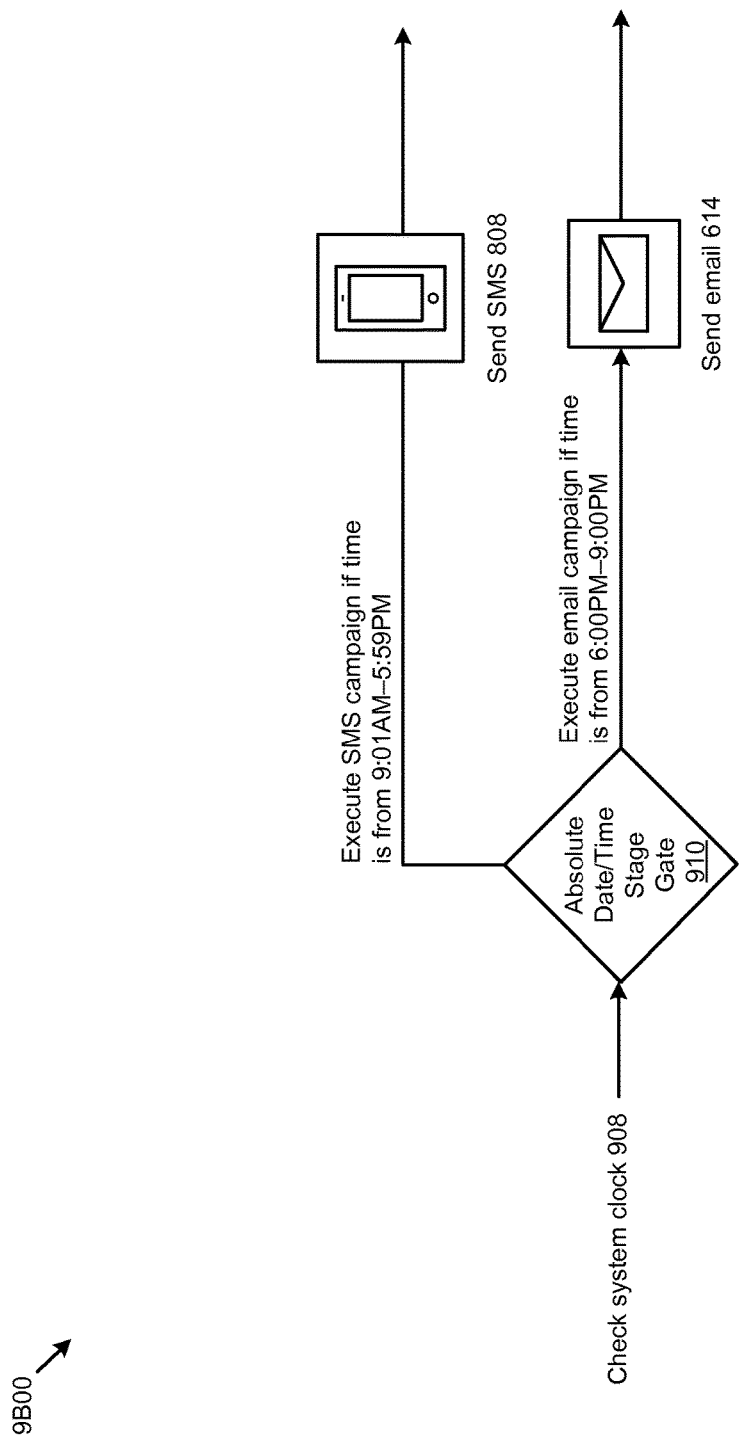
FIG. 9B presents a date and time condition stage gate scenario using a drag-and-drop date and time condition parameterization to control real-time execution of internet communication programs, according to an embodiment.

FIG. 9B presents a date and time condition stage gate scenario 9B00 using a drag-and-drop date and time condition parameterization to control real-time execution of internet communication programs. As an option, one or more variations of date and time condition stage gate scenario 9B00 or any aspect thereof may be implemented in the context of the architecture and functionality of the embodiments described herein. Also, the date and time condition stage gate scenario 9B00 or any aspect thereof may be implemented in any environment.

The schematic illustrates the scenario where one or more timing parameter(s) are configured for a stage gate that is entered after checking a system clock (see entry point 908). As shown in FIG. 9B, an absolute date/time stage gate 910 is configured to include (a) a first timing configuration, where an email campaign is automatically executed time is within the time window 6:00 PM to 9:00 AM; and (b) a second timing configuration, where a SMS campaign is executed only within the time window from 9:01 AM to 5:59 PM.

The time-oriented stage gate expressions of the absolute date/time stage gate 910 are made when the stage gate is encountered during the course of progression through a marketing program flow. The forward path is taken when an evaluated value falls within the scope of the specified timing parameters (e.g., when the timing aspect stage gate expression evaluates to TRUE). In this case, if at the time of the stage gate execution, the time-oriented stage gate expressions of the absolute date/time stage gate 910 falls within the range of the timing configuration of the forward path, then the forward path is taken. In this example situation, the send email path is taken and the send email 614 action is invoked. On the other hand, if the time of stage execution falls within the scope of the alternate timing configuration, then this situation results in execution of the SMS marketing campaign (e.g., see SMS campaign path 808).

Another embodiment pertains to implementation of a throttling aspect to the stage gate. In this embodiment, the actions to be taken from the stage gate can be used to implement throttling as a result of the evaluations. The throttling can be used to adjust the execution performance of the system depending upon any of the previously-described parameters.

Figure 10A:
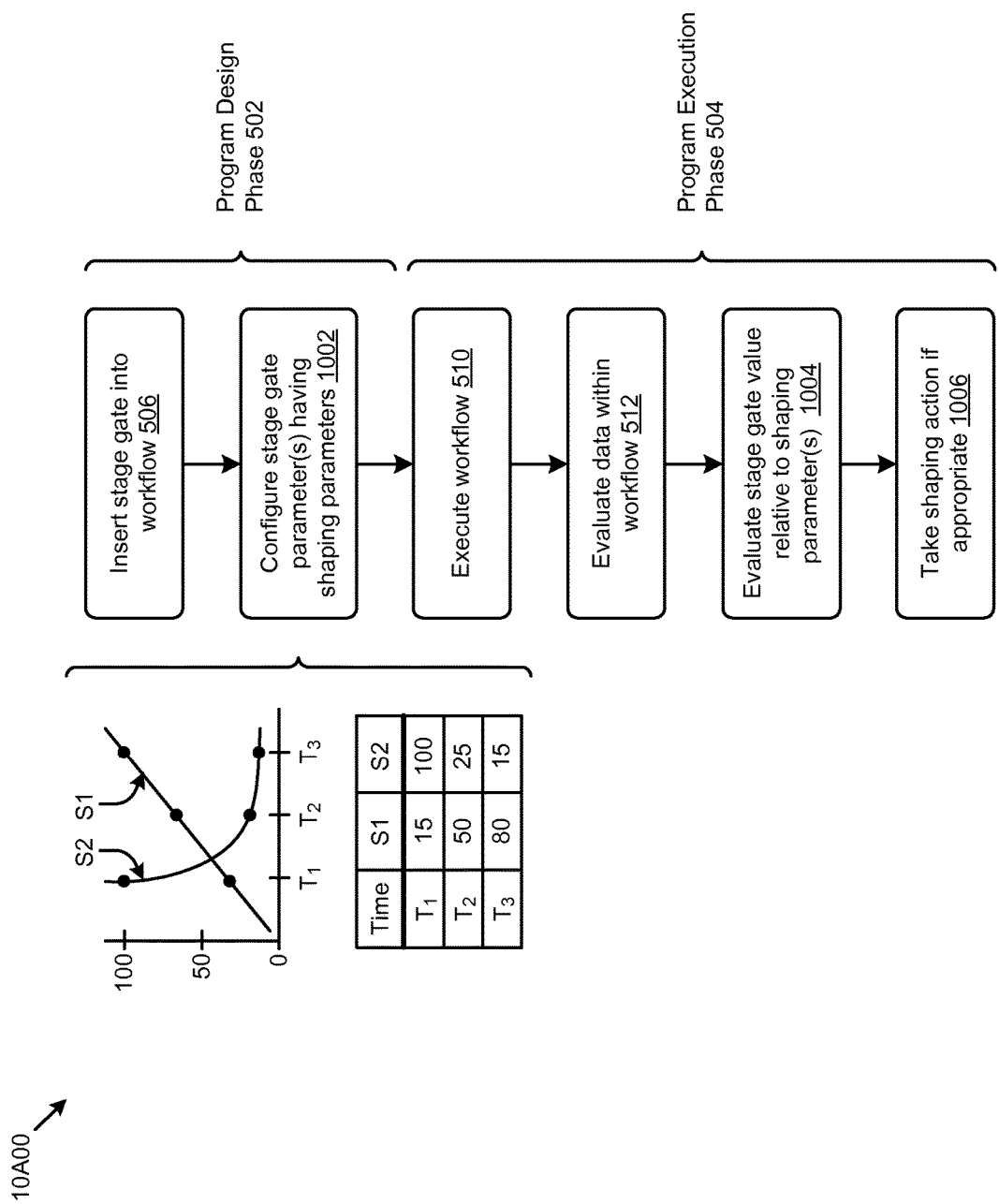
FIG. 10A depicts a marketing program flow having a time and rate condition test to control real-time execution of internet communication programs, according to an embodiment.

FIG. 10A depicts a marketing program flow 10A00 having a time and rate condition test to control real-time execution of internet communication programs. As an option, one or more variations of marketing program flow 10A00 or any aspect thereof may be implemented in the context of the architecture and functionality of the embodiments described herein. Also, the marketing program flow 10A00 or any aspect thereof may be implemented in any environment.

FIG. 10A shows a flowchart of an approach to implement a time and rate condition test in stage gates. The process begins by inserting and configuring the time and rate condition stage gate into a workflow. The process progresses by determining, after a finite amount of time has passed, that a set of conditions for evaluating the stage gate time and rate expressions are present; The time and rate condition stage gate is configured with parameters (see step 1002) corresponding to shaping actions that can be taken, using any appropriate parameter value(s) configured for the stage gate.

Figure 10B:
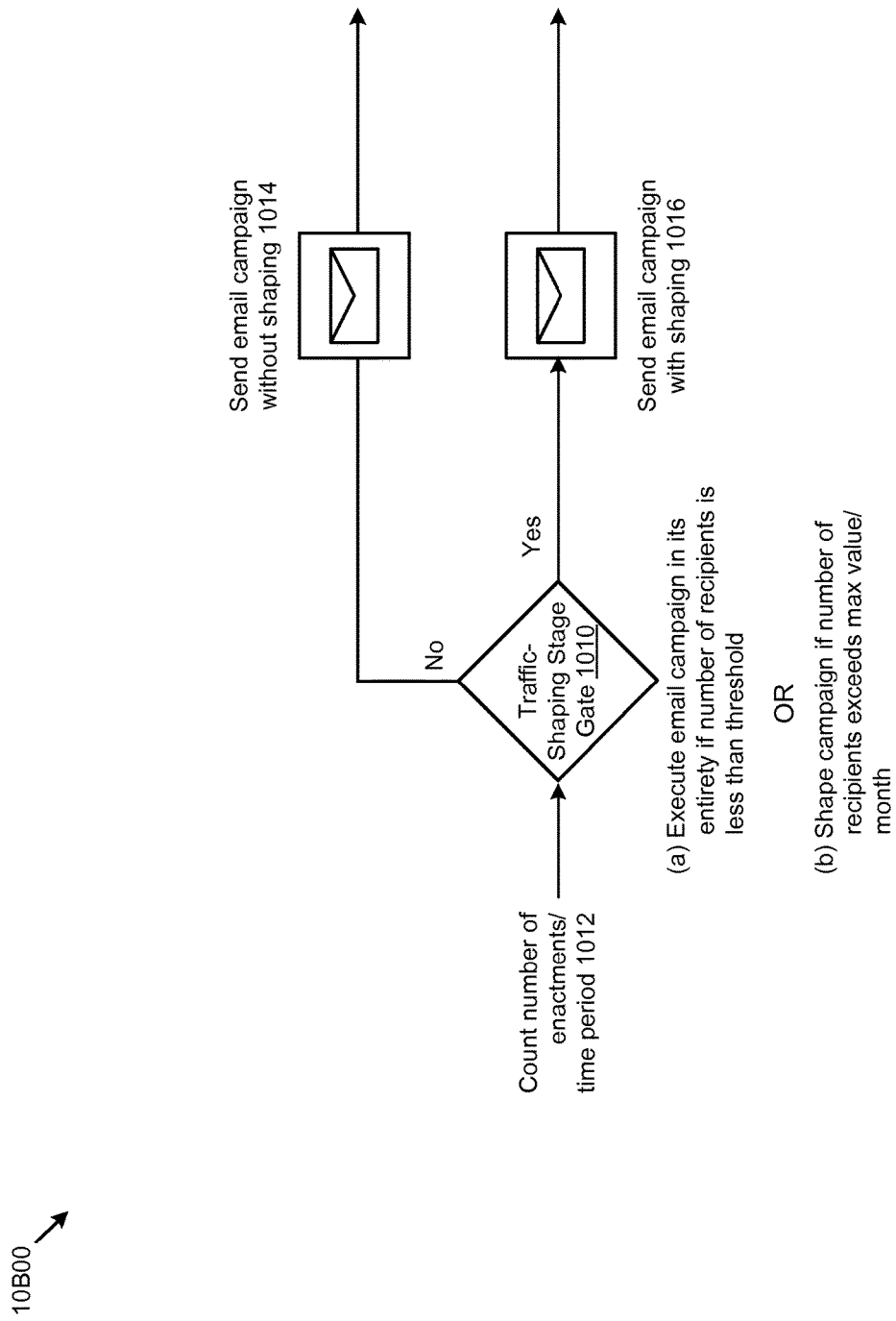
FIG. 10B presents a time and rate condition stage gate scenario using a drag-and-drop time and rate condition parameterization to control real-time execution of internet communication programs, according to an embodiment.

In the examples given here as pertaining to FIG. 10A and FIG. 10B, time and rate conditions take on a shape (e.g., shape S1 and shape S2). Points on the shape are selected (e.g., time T1, time T2, time T3) and respective values are captured. For example, the value for shape S1 at time T1 is 15. The value parameter can refer to any variable and can be specified in any units. During execution a stage gate value related to the set of given shaping parameters is evaluated (see step 1004) and an appropriate action is taken (see step 1006).

Shapes can be defined to characterize outbound email traffic or outbound SMS traffic rates over time (e.g., shapes of traffic volume over time, shapes of traffic initiation over time, shape of traffic suspension actions over time, etc.). Parameterizable shapes can be defined using any known techniques, for example, as a sequence of values (e.g., rate values) over a time period, or as a sequence of time-value pairs (as shown), or as a graph of nodes that are traversed over time (e.g., where each node has an associated parameterized traffic-related value), or as a series of messages comprising payload with shape values, etc.

A shape and its constituent parameters and/or parameter values can define a particular type of message traffic, and/or can define a particular type of personalization of messages comprising the message traffic. A first shape (e.g., having multiple time values corresponding to a first set of actions) can be defined over a first time period, and a second shape (e.g., having multiple time values corresponding to a second set of actions) can be defined over a second period. Any combinations of such time period shapes can be organized as a sequence of parameterized shapes, with any shape referring to any type of traffic and/or any type of message personalization.

FIG. 10B presents a time and rate condition stage gate scenario 10B00 using a drag-and-drop time and rate condition parameterization to control real-time execution of internet communication programs. As an option, one or more variations of time and rate condition stage gate scenario 10B00 or any aspect thereof may be implemented in the context of the architecture and functionality of the embodiments described herein. Also, the time and rate condition stage gate scenario 10B00 or any aspect thereof may be implemented in any environment.

FIG. 10B illustrates the scenario where one or more shaping parameter(s) are configured for the time and rate condition stage gate. Here, a time and rate condition stage gate is configured to include (a) a first shaping configuration, where an email campaign is executed without throttling if the number of targeted recipients is less than a threshold value over a given time period; and (b) a second shaping configuration, where the execution of the email campaign is shaped (e.g., to reduce the rate/timing/throughput of the email generation/mailing) if the number of recipients is greater than the threshold number in the time period. This approach might be used, for example, if a marketer has a limited budget for the email campaign for a given time period, and if shaping is desired to stretch the budget over the entire time period based at least in part upon the number of recipients that are targeted for that time period. During execution, a time and rate condition stage gate 1010 is entered (see entry point 1012) after counting the number of enactments (e.g., over a time period). If one of the action paths are indicated by the shaping parameters, then a first branch is taken (see path 1014). If a different one of the action paths are indicated by the shaping parameters, then a different branch is taken (see path 1016).

Yet another embodiment pertains to the implementation of step gates in the workflow, where multiple stepwise configurations are made for the stage gate. This can be implemented, for example, by configuring the stage gate with information for multiple types/ranges of actions to be taken at various stepped levels of values. For example, a marketer may seek to maximize their return on investment (ROI) by offering increasing discounts (e.g., 10%, 20%, 30%, etc.) based on multiple stepwise configurations of a time and rate condition stage gate.

Additional Embodiments of the Disclosure

Additional Practical Application Examples

Figure 11:
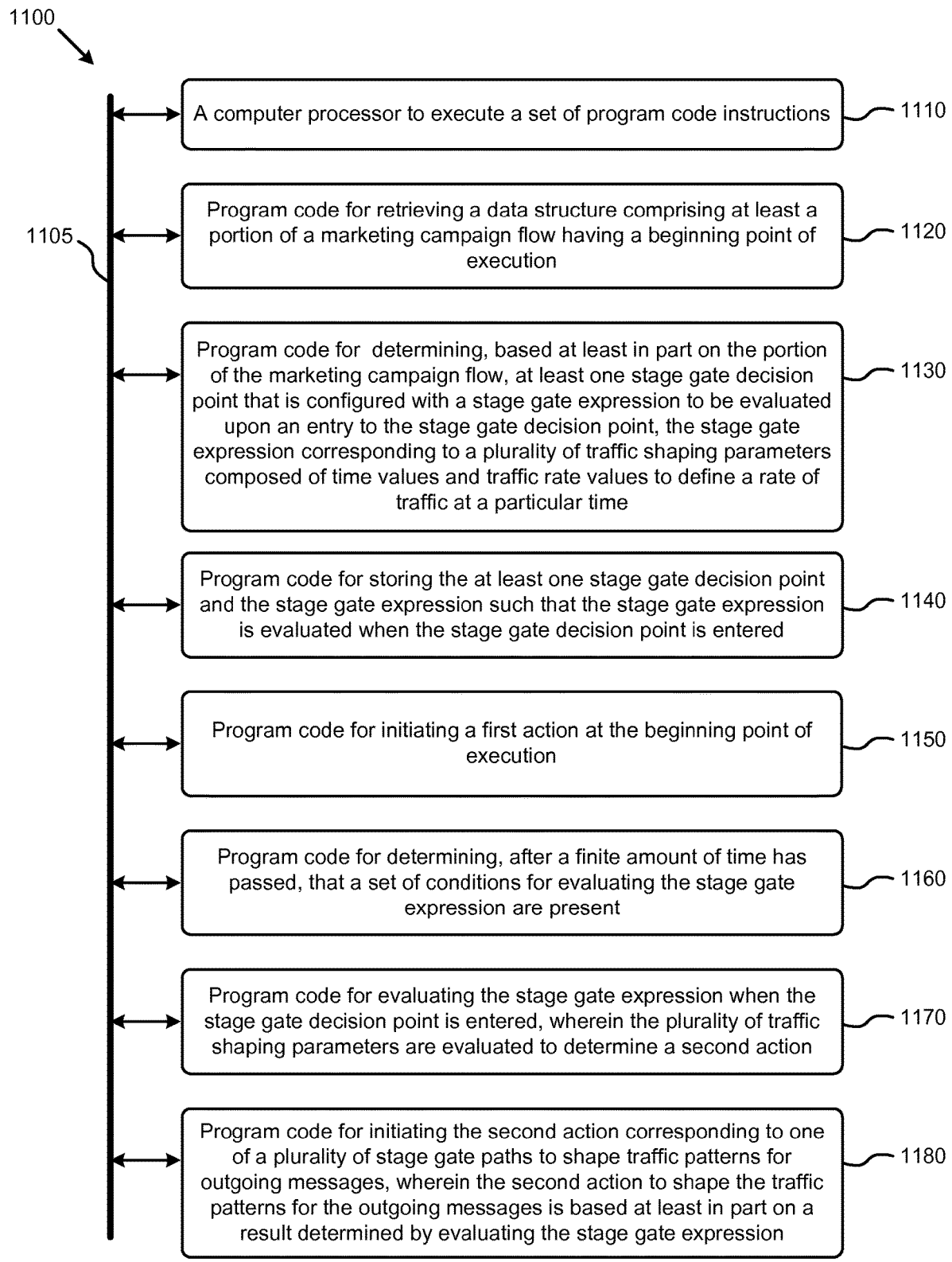
FIG. 11 depicts system components as arrangements of computing modules that are interconnected so as to implement certain of the herein-disclosed embodiments.

FIG. 11 depicts a system 1100 as an arrangement of computing modules that are interconnected so as to operate cooperatively to implement certain of the herein-disclosed embodiments. The partitioning of system 1100 is merely illustrative and other partitions are possible. As an option, the present system 1100 may be implemented in the context of the architecture and functionality of the embodiments described herein. Of course, however, the system 1100 or any operation therein may be carried out in any desired environment. The system 1100 comprises at least one processor and at least one memory, the memory serving to store program instructions corresponding to the operations of the system. As shown, an operation can be implemented in whole or in part using program instructions accessible by a module. The modules are connected to a communication path 1105, and any operation can communicate with other operations over communication path 1105. The modules of the system can, individually or in combination, perform method operations within system 1100. Any operations performed within system 1100 may be performed in any order unless as may be specified in the claims. The shown embodiment implements a portion of a computer system, presented as system 1100, comprising a computer processor to execute a set of program code instructions (see module 1110) and modules for accessing memory to hold program code instructions to perform: retrieving a data structure comprising at least a portion of a marketing campaign flow having a beginning point of execution (see module 1120); determining, based at least in part on the portion of the marketing campaign flow, at least one stage gate decision point that is configured with a stage gate expression to be evaluated upon an entry to the stage gate decision point, the stage gate expression corresponding to a plurality of traffic shaping parameters composed of time values and traffic rate values to define a rate of traffic at a particular time (see module 1130); storing the at least one stage gate decision point and the stage gate expression such that the stage gate expression is evaluated when the stage gate decision point is entered (see module 1140); initiating a first action at the beginning point of execution (see module 1150); determining, after a finite amount of time has passed, that a set of conditions for evaluating the stage gate expression are present (see module 1160); evaluating the stage gate expression when the stage gate decision point is entered, wherein the plurality of traffic shaping parameters are evaluated to determine a second action (see module 1170); and initiating the second action corresponding to one of a plurality of stage gate paths to shape traffic patterns for outgoing messages, wherein the second action to shape the traffic patterns for the outgoing messages is based at least in part on a result determined by evaluating the stage gate expression (see module 1180).

System Architecture Overview

Additional System Architecture Examples

Figure 12A:
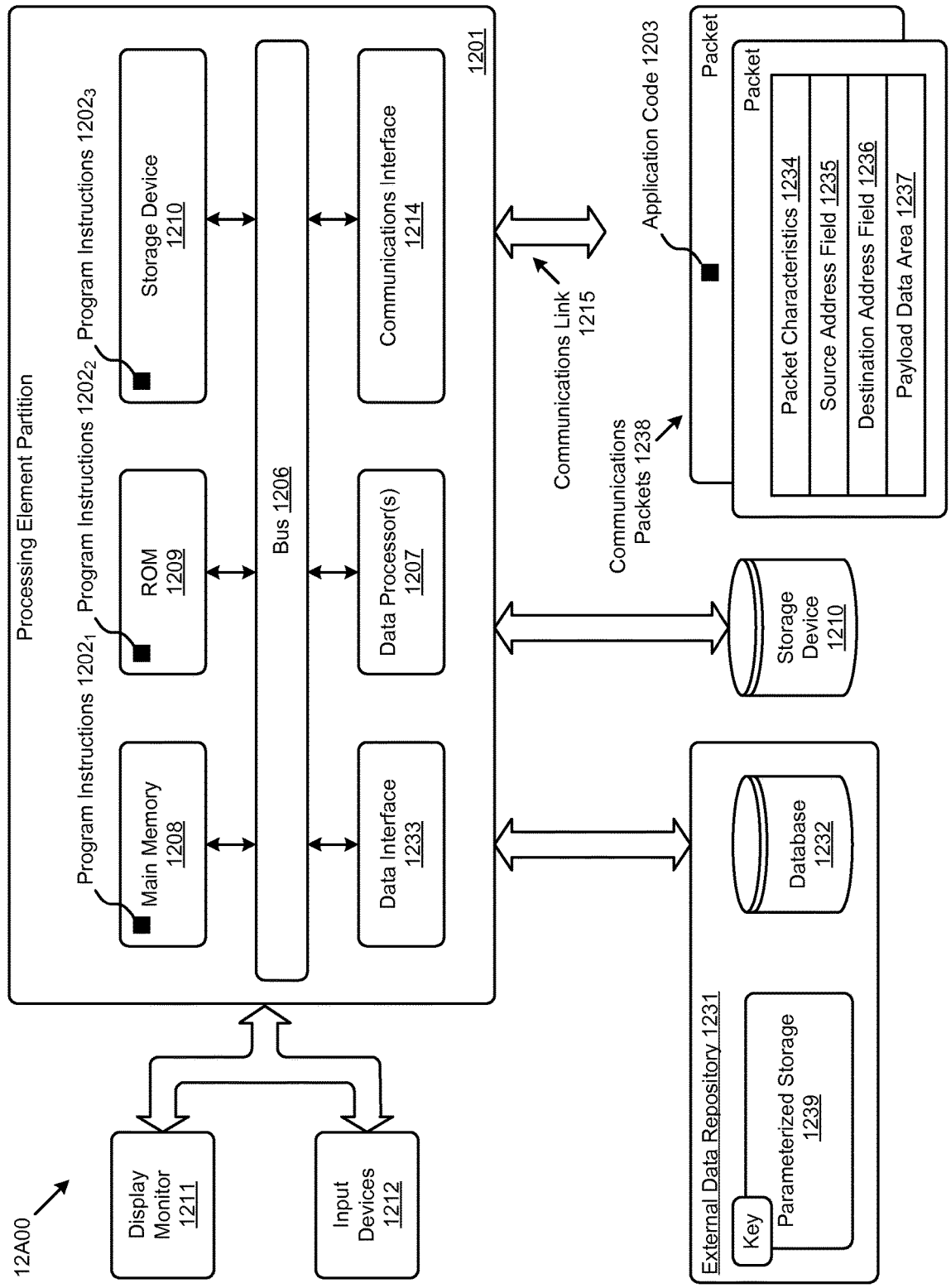
FIG. 12A, FIG. 12B, and FIG. 12C depict exemplary architectures of components suitable for implementing embodiments of the present disclosure, and/or for use in the herein-described environments.

FIG. 12A depicts a block diagram of an instance of a computer system 12A00 suitable for implementing embodiments of the present disclosure. Computer system 12A00 includes a bus 1206 or other communication mechanism for communicating information. The bus interconnects subsystems and devices such as a CPU, or a multi-core CPU (e.g., data processor 1207), a system memory (e.g., main memory 1208, or an area of random access memory (RAM)), a non-volatile storage device or non-volatile storage area (e.g., read-only memory 1209), an internal or external storage device 1210 (e.g., magnetic or optical), a data interface 1233, a communications interface 1214 (e.g., PHY, MAC, Ethernet interface, modem, etc.). The aforementioned components are shown within processing element partition 1201, however other partitions are possible. The shown computer system 12A00 further comprises a display 1211 (e.g., CRT or LCD), various input devices 1212 (e.g., keyboard, cursor control), and an external data repository 1231.

According to an embodiment of the disclosure, computer system 12A00 performs specific operations by data processor 1207 executing one or more sequences of one or more program code instructions contained in a memory. Such instructions (e.g., program instructions 1202$_1$, program instructions 1202$_2$, program instructions 1202$_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination therefrom.

In one embodiment, a BPM engine is stored in the memory of the computer system 12A00 and is executed by the data processor 1207. In certain embodiments, the BPM engine is stored in a memory accessible by a website server and is executed by a processor of the website server. Such a website server may be configured to deliver a user interface to the user at the computer system 12A00 via a network, and a user interface may be displayed in a web browser executed by the website server, possibly in coordination with computer system 12A00.

According to an embodiment of the disclosure, computer system 12A00 performs specific networking operations using one or more instances of communications interface 1214. Instances of the communications interface 1214 may comprise one or more networking ports that are configurable (e.g., pertaining to speed, protocol, physical layer characteristics, media access characteristics, etc.) and any particular instance of the communications interface 1214 or port thereto can be configured differently from any other particular instance. Portions of a communication protocol can be carried out in whole or in part by any instance of the communications interface 1214, and data (e.g., packets, data structures, bit fields, etc.) can be positioned in storage locations within communications interface 1214, or within system memory, and such data can be accessed (e.g., using random access addressing, or using direct memory access DMA, etc.) by devices such as data processor 1207.

The communications link 1215 can be configured to transmit (e.g., send, receive, signal, etc.) any types of communications packets 1238 comprising any organization of data items. The data items can comprise a payload data area 1237, a destination address 1236 (e.g., a destination IP address), a source address 1235 (e.g., a source IP address), and can include various encodings or formatting of bit fields to populate the shown packet characteristics 1234. In some cases the packet characteristics include a version identifier, a packet or payload length, a traffic class, a flow label, etc. In some cases the payload data area 1237 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 1207 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 1231, which in turn can be formatted into any one or more storage areas, and which can comprise parameterized storage 1239 accessible by a key (e.g., filename, table name, block address, offset address, etc.).

Execution of the sequences of instructions to practice certain embodiments of the disclosure are performed by a single instance of the computer system 12A00. According to certain embodiments of the disclosure, two or more instances of computer system 12A00 coupled by a communications link 1215 (e.g., LAN, PTSN, or wireless network) may perform the sequence of instructions required to practice embodiments of the disclosure using two or more instances of components of computer system 12A00.

The computer system 12A00 may transmit and receive messages such as data and/or instructions organized into a data structure (e.g., communications packets 1238). The data structure can include program instructions (e.g., application code 1203), communicated through communications link 1215 and communications interface 1214. Received program code may be executed by data processor 1207 as it is received and/or stored in the shown storage device or in or upon any other non-volatile storage for later execution. Computer system 12A00 may communicate through a data interface 1233 to a database 1232 on an external data repository 1231. Data items in a database can be accessed using a primary key (e.g., a relational database primary key).

The processing element partition 1201 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 1207. Some embodiments include one or more special-purpose hardware components (e.g., power control, logic, sensors, transducers, etc.). A module may include one or more state machines and/or combinational logic used to implement or facilitate the performance of controlling real-time execution of internet communication campaigns with parameterizable flow control structures.

Various implementations of the database 1232 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of controlling real-time execution of internet communication campaigns with parameterizable flow control structures). Such files or records can be brought into and/or stored in volatile or non-volatile memory.

Figure 12B:
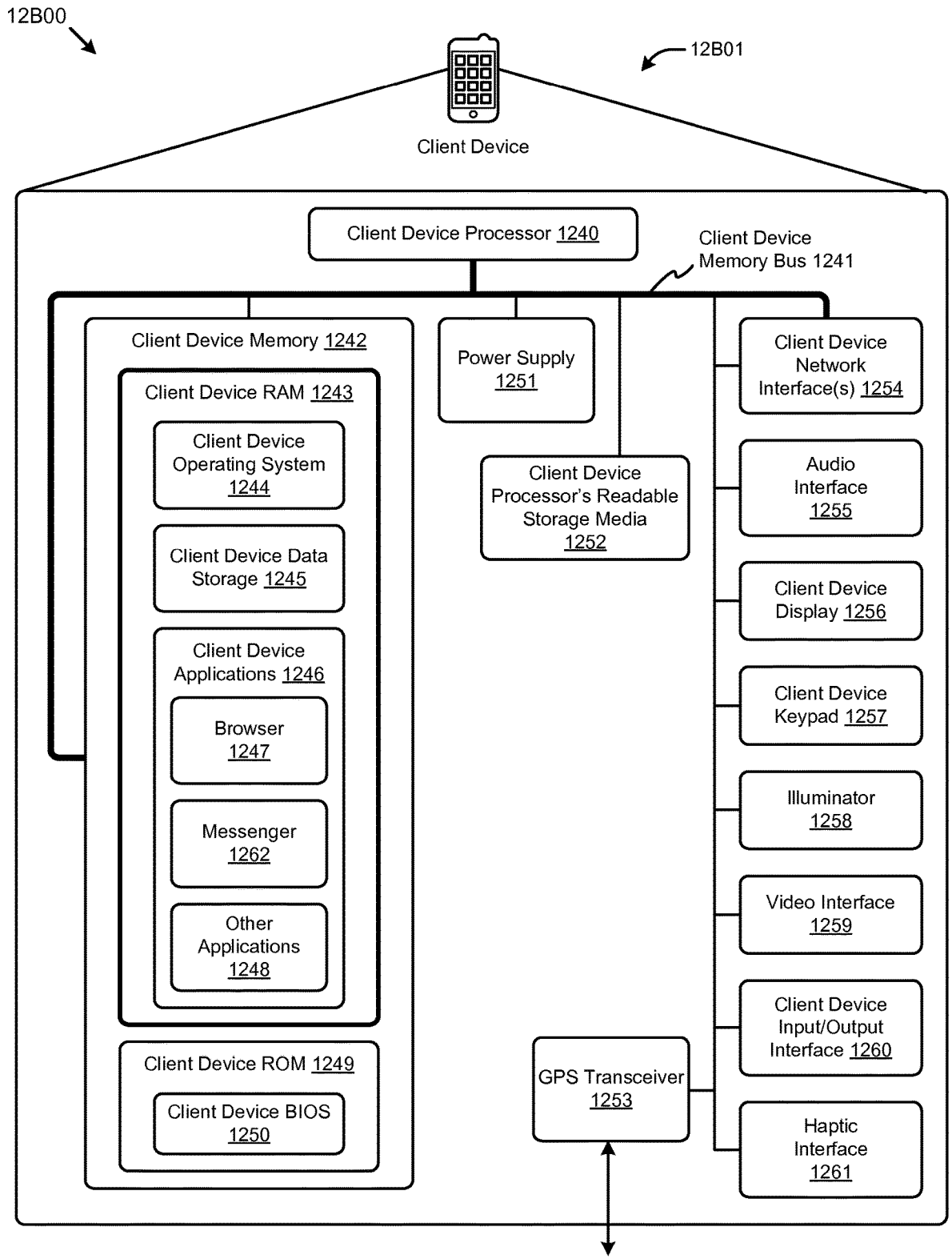

FIG. 12B depicts a block diagram 12B00 of an instance of a client device 12B01 that may be included in a system implementing instances of the herein-disclosed embodiments. Client device 12B01 may include many more or fewer components than those shown in FIG. 12B. Client device 12B01 may represent, for example, an embodiment of at least one of client devices as heretofore disclosed.

As shown in the figure, client device 12B01 includes a client device processor 1240 in communication with a client device memory 1242 via a client device memory bus 1241. Client device 12B01 also includes a power supply 1251, one or more client device network interfaces 1254, an audio interface 1255, a client device display 1256, a client device keypad 1257, an illuminator 1258, a video interface 1259, a client device IO interface 1260, a haptic interface 1261, and a GPS transceiver 1253 for global positioning services.

The power supply 1251 provides power to client device 12B01. A rechargeable or non-rechargeable battery may be used to provide power. The power may also be provided by an external power source such as an AC adapter or a powered docking cradle that supplements and/or recharges a battery.

A client device 12B01 may optionally communicate with a base station, or directly with another computing device. A client device network interface 1254 includes circuitry for coupling a client device 12B01 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), short message service (SMS), general packet radio service (GPRS), wireless access protocol (WAP), ultra wide band (UWB), IEEE 802.16 Worldwide Interoperability for Microwave Access (WiMax), session initiated protocol/real-time transport protocol (SIP/RTP), or any of a variety of other wireless communication protocols. A client device network interface is sometimes known as a transceiver, a transceiving device, or a network interface card (NIC).

An audio interface 1255 is arranged to produce and receive audio signals such as the sound of a human voice. For example, audio interface 1255 may be coupled to a speaker and microphone to enable telecommunication with others and/or generate an audio acknowledgement for some action.

A client device display 1256 may be a liquid crystal display (LCD), gas plasma, light emitting diode (LED), or any other type of display used with a computing device. A client device display 1256 may also include a touch sensitive screen arranged to receive input from an object such as a stylus or a digit from a human hand.

A client device keypad 1257 may comprise any input device arranged to receive input from a user. For example, client device keypad 1257 may include a push button numeric dial, or a keyboard. A client device keypad 1257 may also include command buttons that are associated with selecting and sending images.

An illuminator 1258 may provide a status indication and/or provide light. Illuminator 1258 may remain active for specific periods of time or in response to events. For example, when the illuminator 1258 is active, it may backlight the buttons on client device keypad 1257 and stay on while the client device is powered. Also, the illuminator 1258 may backlight these buttons in various patterns when particular actions are performed such as dialing another client device. An illuminator 1258 may also cause light sources positioned within a transparent or translucent case of the client device to illuminate in response to actions.

A video interface 1259 is arranged to capture video images such as a still photo, a video segment, an infrared video or the like. For example, the video interface 1259 may be coupled to a digital video camera, a web-camera or the like. A video interface 1259 may comprise a lens, an image sensor, and other electronics. Image sensors may include a complementary metal-oxide-semiconductor (CMOS) integrated circuit, charge-coupled device (CCD), or any other integrated circuit for sensing light.

Some instances of the shown client device 12B01 comprise a client device IO interface 1260 for communicating with external devices such as a headset, or other input or output devices not shown in FIG. 12B. The client device IO interface 1260 can use one or more communication technologies such as a USB, infrared, Bluetooth™ port or the like. A haptic interface 1261 is arranged to as a human interface device (HID) to facilitate interaction with a user of a client device. Such interaction can include tactile feedback to a user of the client device. For example, the haptic interface 1261 may be employed to cause vibration of the client device 12B01 in a particular way (e.g., with a pattern or periodicity) and/or when interacting with one or another user.

A GPS transceiver 1253 can determine the physical coordinates of client device 12B01 on the surface of the Earth. The GPS transceiver 1253, in some embodiments, may be optional. The shown GPS transceiver 1253 outputs a location such as a latitude value and a longitude value. However, the GPS transceiver 1253 can also employ other geo-positioning mechanisms including, but not limited to, triangulation, assisted GPS (AGPS), enhanced observed time difference (E-OTD), cell identifier (CI), service area identifier (SAI), enhanced timing advance (ETA), base station subsystem (BSS) or the like, to determine the physical location of client device 12B01 on the surface of the Earth. It is understood that under different conditions, a GPS transceiver 1253 can determine a physical location within millimeters for client device 12B01; and in other cases, the determined physical location may be less precise such as within a meter or significantly greater distances. In certain embodiments, the client device 12B01 may provide other information that may be employed to determine a physical location of the device including, for example, a media access control (MAC) address, IP address, IP port identifier, or the like.

The client device memory 1242 includes random access memory 1243, read-only memory 1249, and other computer-readable storage. The client device memory 1242 illustrates an example of computer readable storage media (devices) for storage of information such as computer readable instructions, data structures, program modules or other data. The client device memory 1242 stores a basic IO system (BIOS) in the embodiment of client device BIOS 1250 for controlling low-level operation of client device 12B01. The memory also stores an operating system 1244 for controlling the operation of client device 12B01. It will be appreciated that this component may include a general-purpose operating system such as a version of UNIX, or LINUX™, or a specialized client communication operating system such as Microsoft Corporation's Windows Mobile™, Apple Corporation's iOS™, Google Corporation's Android™, or the Symbian® operating system. The operating system may include or interface with a Java virtual machine module that enables control of hardware components and/or operating system operations via Java application programs.

The client device memory 1242 further includes one or more instances of client device data storage 1245, which can be used by client device 12B01 to store, among other things, client device applications 1246 and/or other data. For example, client device data storage 1245 may also be employed to store information that describes various capabilities of client device 12B01. The information may then be provided to another device based on any of a variety of events including being sent as part of a header during a communication, sent upon request or the like. Client device data storage 1245 may also be employed to store social networking information including address books, buddy lists, aliases, user profile information or the like. Further, client device data storage 1245 may also store messages, web page content, or any of a variety of content (e.g., received content, user generated content, etc.).

At least a portion of the information may also be stored on any component or network device including, but not limited, to a client device processor's readable storage media, a disk drive or other computer readable storage devices within client device 12B01, etc.

An instance of a client device processor's readable storage media 1252 may include volatile, nonvolatile, removable, and non-removable media implemented in any method or technology for storage of information such as computer- or processor-readable instructions, data structures, program modules, or other data. Examples of computer readable storage media include RAM, ROM, electrically erasable programmable read-only memory (EEPROM), flash memory or other memory technology, Compact disc read-only memory (CD-ROM), digital versatile disks (DVD) or other optical storage, magnetic cassettes, magnetic tape, magnetic disk storage or other magnetic storage devices, or any other physical medium which can be used to store information and which can be accessed by a computing device. The aforementioned readable storage media may also be referred to herein as computer readable storage media.

The client device applications 1246 may include computer executable instructions which, when executed by client device 12B01, transmit, receive, and/or otherwise process network data. The network data may include, but is not limited to, messages (e.g., SMS, multimedia message service (MMS), instant message (IM), email, and/or other messages), audio, video, and enable telecommunication with another user of another client device. Client device applications 1246 may include, for example, a messenger 1262, a browser 1247, and other applications 1248. Certain instances of other applications 1248 may include, but are not limited to, calendars, search programs, email clients, IM applications, SMS applications, voice over Internet protocol (VOIP) applications, contact managers, task managers, transcoders, database programs, word processing programs, security applications, spreadsheet programs, games, search programs, and so forth. In some embodiments, the applications may collect and store user data that may be received from other computing devices in the environment.

A messenger 1262 may be configured to manage a messaging session using any of a variety of messaging communications including, but not limited to email, SMS, IM, MMS, internet relay chat (IRC), Microsoft IRC (mIRC), really simple syndication (RSS) feeds, and/or the like. For example, in certain embodiments, the messenger 1262 may be configured as an IM application such as AOL (America Online) instant messenger, Yahoo! messenger, .NET messenger server, ICQ or the like. In certain embodiments, the messenger 1262 may be configured to include a mail user agent (MUA) such as Elm, Pine, message handling (MH), Outlook, Eudora, Mac Mail, Mozilla Thunderbird or the like. In another embodiment, the messenger 1262 may be a client device application that is configured to integrate and employ a variety of messaging protocols including, but not limited, to various push and/or pull mechanisms for client device 12B01. In certain embodiments, the messenger 1262 may interact with the browser 1247 for managing messages. As used herein, the term "message" refers to any of a variety of messaging formats, or communications form including, but not limited to, email, SMS, IM, MMS, IRC or the like.

A browser 1247 may include virtually any application configured to receive and display graphics, text, multimedia, messages and the like, employing virtually any web based language. In certain embodiments, the browser application is enabled to employ HDML, WML, WMLScript, JavaScript, SGML, HTML, XML and the like, to display and send a message. However, any of a variety of other web-based programming languages may be employed. In certain embodiments, a browser 1247 may enable a user of client device 12B01 to communicate with another network device as may be present in the environment.

Figure 12C:
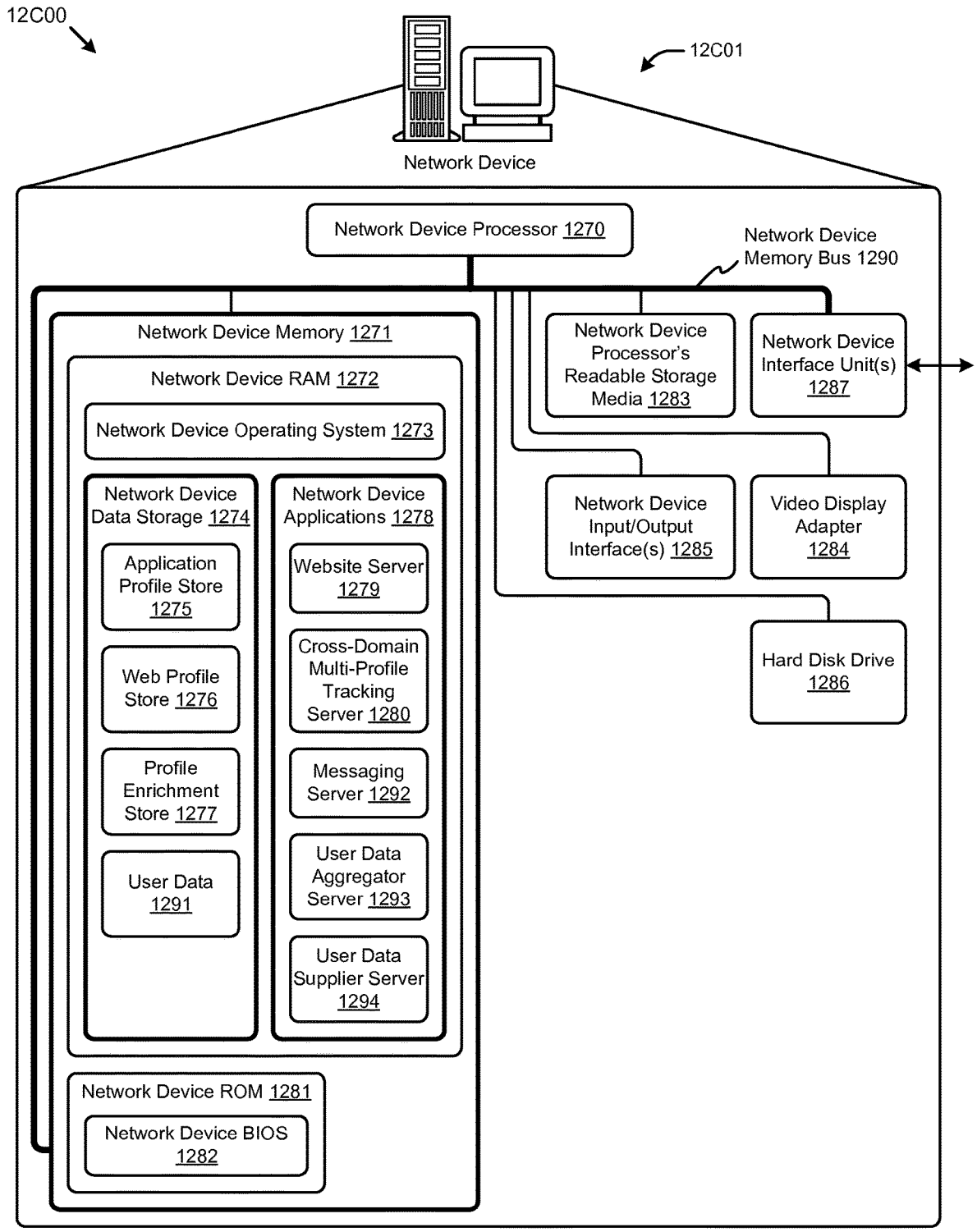

FIG. 12C depicts a block diagram 12C00 of an instance of a network device 12C01 that may be included in a system implementing instances of the herein-disclosed embodiments. Network device 12C01 may include many more or fewer components than those shown. Network device 12C01 may be configured to operate as a server, client, peer, a host, or any other device.

The network device 12C01 includes at least one instance of a network device processor 1270, instances of readable storage media, one or more instances of a network interface unit 1287, a network device IO interface 1285, a hard disk drive 1286, a video display adapter 1284, and a network device memory 1271, all in communication with each other via a network device memory bus 1290. The network device memory generally includes network device RAM 1272, network device ROM 1281. Some embodiments include one or more non-volatile mass storage devices such as a hard disk drive 1286, a tape drive, an optical drive, and/or a floppy disk drive. The network device memory stores a network device operating system 1273 for controlling the operation of network device 12C01. Any general-purpose operating system may be employed. A basic input/output system (BIOS) is also provided in the form of network device BIOS 1282 for controlling the low-level operation of network device 12C01. As illustrated in FIG. 12C, a network device 12C01 also can communicate with the Internet, or some other communications network, via a network interface unit 1287, which is constructed for use with various communication protocols including the TCP/IP protocol. A network interface unit 1287 is sometimes known as a transceiver, a transceiving device, or a network interface card (NIC). Network device 12C01 also comprises a network device IO interface 1285 for communicating with external devices such as a keyboard or other input or output devices. A network device IO interface 1285 can use one or more communication technologies such as USB, infrared, Bluetooth™ or the like.

The storage devices as described above may use various types of computer readable media, namely tangible forms of non-volatile computer readable storage media and/or a client device processor's readable storage media 1252 and/or a network device processor's readable storage media 1283. Such media may include any combinations of volatile, nonvolatile, removable, and non-removable media implemented in any method or technology for storage of information such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store information and which can be accessed by a computing device.

As shown, network device data storage 1274 may include a database, text storage, a spreadsheet, a folder or directory hierarchy, a file or files or the like that may be configured to maintain and store user account identifiers, user profiles, email addresses, IM addresses, and/or other network addresses or the like. Network device data storage 1274 may further include program code, data, algorithms and the like, for use by a processor such as a network device processor 1270 to execute and perform actions. In certain embodiments, at least some of the logical contents of network device data storage 1274 might be stored on another component of network device 12C01 such as on a second instance of hard disk drive 1286 or on an external/removable storage device.

The network device data storage 1274 may further store any portions of application data and/or user data such as an application profile store 1275, a web profile store 1276, a profile enrichment store 1277 and/or any user data collected. In some embodiments, user data 1291 may store unique user data, non-unique user data, aggregated user data, and/or any combination thereof. User data 1291 may include a variety of attributes such as a five digit zip code, an expanded nine digit zip code and the like.

The Network device data storage 1274 may also store program code and data. One or more network device applications 1278 may be loaded into network device data storage or any other mass memory, to be accessible to run with or as a part of network device operating system 1273. Examples of network device application programs may include transcoders, schedulers, calendars, database programs, word processing programs, hypertext transfer protocol (HTTP) programs, customizable user interface programs, IPSec applications, encryption programs, security programs, SMS message servers, IM message servers, email servers, account managers, and so forth. A messaging server 1292, website server 1279, user data aggregator server 1293, a cross-domain multi-profile tracking server 1280, and/or user data supplier server 1294 may also be included within or implemented as application programs.

A messaging server 1292 may include virtually any computing component or components configured and arranged to forward messages from message user agents and/or other message servers, or to deliver messages to a local message store such as network device data storage 1274 or the like. Thus, a messaging server 1292 may include a message transfer manager to communicate a message employing any of a variety of email protocols including, but not limited, to simple mail transfer protocol (SMTP), post office protocol (POP), Internet message access protocol (IMAP), network new transfer protocol (NNTP) or the like. A messaging server 1292 may also be managed by one or more components of the messaging server 1292. Thus, the messaging server 1292 may also be configured to manage SMS messages; IM, MMS, IRC, or RSS feeds; mIRC; or any of a variety of other message types. In certain embodiments, the messaging server 1292 may enable users to initiate and/or otherwise conduct chat sessions, VOIP sessions or the like.

A website server 1279 may represent any of a variety of information and services that are configured to provide content, including messages, over a network to another computing device. Thus, a website server 1279 can include, for example, a web server, a file transfer protocol (FTP) server, a database server, a content server or the like. A website server 1279 may provide the content including messages over the network using any of a variety of formats including, but not limited to WAP, HDML, WML, SGML, HTML, XML, compact HTML (cHTML), extensible HTML (xHTML) or the like. A website server 1279 may also be configured to enable a user of a client device to browse websites, upload user data, view and interact with advertisements or the like.

A user data aggregator server 1293 is configured to aggregate user data to be provided to user data buyers for advertising campaigns. In certain embodiments, a user data aggregator server 1293 may be configured to receive collected user data from a user data supplier server 1294. In some embodiments, a user data aggregator server 1293 may receive a query for user data. Based on the query, a user data aggregator server 1293 may generate a plurality of subsets of aggregated user data. In some embodiments, user data aggregator server 1293 may be included in a network device.

A user data supplier server 1294 is configured to collect user data. In certain embodiments, the user data supplier server 1294 may be configured to provide the collected user data to user data aggregator server 1293. In some embodiments, the user data supplier server 1294 may collect and/or provide unique user data and/or non-unique user data. In certain embodiments, the user data supplier server 1294 may aggregate the collected user data. In some embodiments, the user data supplier server 1294 may be included in any computing device such as heretofore described.

Returning to discussion of the heretofore introduced environments, the environments includes components with which various systems can be implemented. Not all of the components shown may be required to practice the embodiments, and variations in the arrangement and type of the components may be made without departing from the spirit or scope of the disclosure.

Various environment in which embodiments of the disclosure operate may include local area networks (LANs)/wide area networks (WANs), wireless networks, client devices (e.g., user stations). The overall network, including any sub-networks and/or wireless networks, are in communication with, and enables communication between components in the environment.

Instances of client devices may include virtually any computing device capable of communicating over a network to send and receive information, including instant messages, performing various online activities or the like. It should be recognized that more or fewer client devices may be included within a system such as described herein, and embodiments are therefore not constrained by the number or type of client devices employed.

Devices that may operate as client devices may include devices that can connect using a wired or wireless communications medium such as personal computers, servers, multiprocessor systems, microprocessor-based or programmable consumer electronics, network PCs or the like. In some embodiments, client devices may include virtually any portable computing device capable of connecting to another computing device and receiving information such as a laptop computer, a smart phone, a tablet computer, or the like. Portable or mobile computer devices are may also include or operate in conjunction with other portable devices such as cellular telephones, display pagers, radio frequency (RF) devices, infrared (IR) devices, personal digital assistants (PDAs), handheld computers, wearable computers integrated devices combining one or more of the preceding devices and the like. As such, client devices can range widely in terms of capabilities and features. Moreover, client devices may provide access to various computing applications including a browser or other web-based applications. A web-enabled client device may include a browser application that is configured to receive and to send web pages, web-based messages and the like. The browser application may be configured to receive and display graphics, text, multimedia and the like, employing virtually any web-based language including a wireless application protocol messages (WAP) and the like. In certain embodiments, the browser application is enabled to employ handheld device markup language (HDML), wireless markup language (WML), WMLScript, JavaScript, standard generalized markup language (SGML), HyperText markup language (HTML), eXtensible markup language (XML) and the like, to display and send a message. In certain embodiments, a user of the client device may employ the browser application to perform various activities over a network (online). However, another application may also be used to perform various online activities.

Client devices may include at least one client application that is configured to receive and/or send data between other computing devices (e.g., server components). The client application may include a capability to provide send and/or receive content or the like. The client application may further provide information that identifies itself including a type, capability, name or the like. In certain embodiments, a client device may uniquely identify itself through any of a variety of mechanisms including a phone number, mobile identification number (MIN), an electronic serial number (ESN), or other mobile device identifier. The information may also indicate a content format that the mobile device is enabled to employ. Such information may be provided in a network packet or the like, sent between other client devices, or sent between other computing devices.

Client devices may be further configured to include a client application that enables an end-user to log into an end-user account that may be managed by another computing device. Such end-user accounts, in one non-limiting example, may be configured to enable the end-user to manage one or more online activities including, in one non-limiting example, search activities, social networking activities, browse various websites, communicate with other users, participate in gaming, interact with various applications or the like. However, participation in online activities may also be performed without logging into the end-user account.

A wireless communication capability is configured to couple client devices and other components with network. Wireless network may include any of a variety of wireless sub-networks that may further overlay stand-alone and/or ad-hoc networks and the like, to provide an infrastructure-oriented connection for client devices. Such sub-networks may include mesh networks, wireless LAN (WLAN) networks, cellular networks and the like. In certain embodiments, the system may include more than one wireless network.

A wireless network may further include an autonomous system of terminals, gateways, routers, mobile network edge devices and the like which may be connected by wireless radio links, etc. Connections may be configured to move freely and randomly and organize themselves arbitrarily such that the topology of a wireless network may change rapidly. A wireless network may further employ a plurality of access technologies including AMPS and/or second generation (2G), and/or third generation (3G), and/or fourth generation (4G) generation radio access for cellular systems, WLAN, wireless router (WR) mesh and the like. The foregoing access technologies as well as emerging and/or future access technologies may enable wide area coverage for mobile devices such as client devices with various degrees of mobility. In one non-limiting example, wireless network may enable a radio connection through a radio network access such as a global system for mobile (GSM) communication, general packet radio services (GPRS), enhanced data GSM environment (EDGE), wideband code division multiple access (WCDMA) and the like. A wireless network may include any wireless communication mechanism by which information may travel between client devices and/or between any other computing devices and/or over or between other networks or network components.

Any of the foregoing networks can be configured to couple network devices with other computing devices and communication can include communicating over the Internet. In some situations communication is carried out using combinations of LANs, WANs, as well as direct connections such as through a universal serial bus (USB) port, other forms of computer readable media. On an interconnected set of LANs, including those based on differing architectures and protocols, a router acts as a link between LANs, enabling messages to be sent from one to another. In addition, communications links within LANs may include twisted wire pair or coaxial cable, while communications links between networks may use analog telephone lines, full or fractional dedicated digital lines including T1, T2, T3, and T4, and/or other carrier mechanisms including, for example, E-carriers, integrated services digital networks (ISDNs), digital subscriber lines (DSLs), wireless links including satellite links, or other communications links known to those skilled in the art. Moreover, communications links may further employ any of a variety of digital signaling technologies including, without limit, for example, DS-0, DS-1, DS-2, DS-3, DS-4, OC-3, OC-12, OC-48 or the like. Furthermore, remote computers and other related electronic devices can be remotely connected to either LANs or WANs via a modem and temporary telephone link. In various embodiments, a network may be configured to transport information of an Internet protocol (IP). In some cases, communication media carries computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings to be regarded in an illustrative sense rather than in a restrictive sense.

What is claimed is:

1. A method comprising:
retrieving a data structure comprising at least a portion of a marketing campaign flow having a beginning point of execution;
determining, based at least in part on the portion of the marketing campaign flow, at least one stage gate decision point that is configured with a first stage gate expression to be evaluated upon an entry to the stage gate decision point, the first stage gate expression corresponding to a plurality of traffic shaping parameters composed of time values and traffic rate values to define a rate of traffic at a particular time;
storing the at least one stage gate decision point and the first stage gate expression such that the first stage gate expression is evaluated when the stage gate decision point is entered;
initiating a first action at the beginning point of execution;
determining, after a finite amount of time has passed, that a set of conditions for evaluating the first stage gate expression are present;
evaluating the first stage gate expression when the stage gate decision point is entered, wherein the plurality of traffic shaping parameters are evaluated to determine a second action, the second action based on determining points and respective values from one or more shapes of the shaping parameters;
initiating the second action corresponding to one of a plurality of stage gate paths to shape traffic patterns for first outgoing messages, wherein the second action to shape the traffic patterns for the first outgoing messages is based at least in part on a result determined by evaluating the first stage gate expression, the second action comprising a throttling of first outbound email traffic over time or first outbound SMS traffic over time; and
determining a number of targeted recipients for the campaign;
evaluating a second stage gate expression that evaluates the number of targeted recipients and if the number is within a first numerical range, sending second outgoing messages as SMS traffic, and if the number is within a second numerical range, sending the second outgoing messages as email traffic;
wherein the first stage gate expression and the second stage gate expression are evaluated by a program stage manager comprising a channel engine to direct a flow of messages, the channel engine comprising a plurality of personalization engines that personalize outgoing messages for each recipient using an interactive template engine;
wherein the personalization engines use personalization data for each of a plurality of clients stored in a data delivery platform using an in-memory cache that is kept in sync with a master database of all client data.

2. The method of claim 1, wherein the traffic shaping comprises parameters that define a particular type of message traffic, or a particular type of personalization of messages, or parameters that correspond to the first action, or parameters that correspond the second action, of any combination thereof.

3. The method of claim 1, wherein the stage gate decision point is a time and rate condition stage gate.

4. The method of claim 1, wherein the second action corresponding to one of a plurality of stage gate paths is at least one of, an email campaign path, or an SMS campaign path, or any combination thereof.

5. The method of claim 1, wherein the first stage gate expression is evaluated periodically during execution of the marketing campaign flow.

6. The method of claim 5, further comprising re-evaluating the first stage gate expression when a stage is completed.

7. The method of claim 5, further comprising re-evaluating the first stage gate expression upon transition out of a blocked state.

8. The method of claim 1, further comprising determining a mode of the stage gate decision point.

9. The method of claim 8, wherein the mode comprises at least one of, a manual mode setting, or an automatic mode setting.

10. The method of claim 1, further comprising evaluating a third stage gate expression that defines a third numerical range for third outgoing messages, wherein the third outgoing messages are sent only when the number of targeted recipients is within the numerical range.

11. A computer program product, embodied in a non-transitory computer readable medium, the non-transitory computer readable medium having stored thereon a sequence of instructions which, when stored in memory and executed by a processor causes the processor to perform:
retrieving a data structure comprising at least a portion of a marketing campaign flow having a beginning point of execution;
determining, based at least in part on the portion of the marketing campaign flow, at least one stage gate decision point that is configured with a first stage gate expression to be evaluated upon an entry to the stage gate decision point, the first stage gate expression corresponding to a plurality of traffic shaping parameters composed of time values and traffic rate values to define a rate of traffic at a particular time;
storing the at least one stage gate decision point and the first stage gate expression such that the first stage gate expression is evaluated when the stage gate decision point is entered;
initiating a first action at the beginning point of execution;
determining, after a finite amount of time has passed, that a set of conditions for evaluating the first stage gate expression are present;
evaluating the first stage gate expression when the stage gate decision point is entered, wherein the plurality of traffic shaping parameters are evaluated to determine a second action, the second action based on determining points and respective values from one or more shapes of the shaping parameters;
initiating the second action corresponding to one of a plurality of stage gate paths to shape traffic patterns for first outgoing messages, wherein the second action to shape the traffic patterns for the first outgoing messages is based at least in part on a result determined by evaluating the first stage gate expression, the second action comprising a throttling of first outbound email traffic over time or first outbound SMS traffic over time; and
determining a number of targeted recipients for the campaign;
evaluating a second stage gate expression that evaluates the number of targeted recipients and if the number is within a first numerical range, sending second outgoing messages as SMS traffic, and if the number is within a second numerical range, sending the second outgoing messages as email traffic;
wherein the first stage gate expression and the second stage gate expression are evaluated by a program stage manager comprising a channel engine to direct a flow of messages, the channel engine comprising a plurality of personalization engines that personalize outgoing messages for each recipient using an interactive template engine;
wherein the personalization engines use personalization data for each of a plurality of clients stored in a data delivery platform using an in-memory cache that is kept in sync with a master database of all client data.

12. The computer program product of claim 11, wherein the traffic shaping comprises parameters that define a particular type of message traffic, or a particular type of personalization of messages, or parameters that correspond to the first action, or parameters that correspond the second action, of any combination thereof.

13. The computer program product of claim 11, wherein the stage gate decision point is a time and rate condition stage gate.

14. The computer program product of claim 11, wherein the second action corresponding to one of a plurality of stage gate paths is at least one of, an email campaign path, or an SMS campaign path, or any combination thereof.

15. The computer program product of claim 11, wherein the first stage gate expression is evaluated periodically during execution of the marketing campaign flow.

16. The computer program product of claim 15, further comprising instructions which, when stored in memory and executed by the processor causes the processor to perform re-evaluating the first stage gate expression when a stage is completed.

17. The computer program product of claim 15, further comprising instructions which, when stored in memory and executed by the processor causes the processor to perform re-evaluating the first stage gate expression upon transition out of a blocked state.

18. The computer program product of claim 11, further comprising instructions which, when stored in memory and executed by the processor causes the processor to evaluate a third stage gate expression that defines a third numerical range for third outgoing messages, wherein the third outgoing messages are sent only when the number of targeted recipients is within the numerical rangeperform determining a mode of the stage gate decision point.

19. A system comprising:
a processor coupled to a storage device that stores instructions, the processor adapted to execute the instructions to implement a program engine, a campaign specification engine and a program stage manager;
the program engine to retrieve a data structure comprising at least a portion of a marketing campaign flow having a beginning point of execution;
the campaign specification engine to,
define, based at least in part on the portion of the marketing campaign flow, at least one stage gate decision point that is configured with a first stage gate expression to be evaluated upon an entry to the stage gate decision point, the first stage gate expression corresponding to a plurality of traffic shaping parameters composed of time values and traffic rate values to define a rate of traffic at a particular time; and
store the at least one stage gate decision point and the first stage gate expression such that the first stage gate expression is evaluated when the stage gate decision point is entered; and
the program stage manager to,
initiate a first action at the beginning point of execution;
determine, after a finite amount of time has passed, that a set of conditions for evaluating the first stage gate expression are present;
evaluate the first stage gate expression when the stage gate decision point is entered, wherein the plurality of traffic shaping parameters are evaluated to determine a second action, the second action based on determining points and respective values from one or more shapes of the shaping parameters;

initiate the second action corresponding to one of a plurality of stage gate paths to shape traffic patterns for first outgoing messages, wherein the second action to shape the traffic patterns for the first outgoing messages is based at least in part on a result determined by evaluating the first stage gate expression, the second action comprising a throttling of first outbound email traffic over time or first outbound SMS traffic over time;

determine a number of targeted recipients for the campaign; and evaluate a second stage gate expression that evaluates the number of targeted recipients and if the number is within a first numerical range, sending second outgoing messages as SMS traffic, and if the number is within a second numerical range, sending the second outgoing messages as email traffic;

wherein the program stage manager comprise a channel engine to direct a flow of messages, the channel engine comprising a plurality of personalization engines that personalize outgoing messages for each recipient using an interactive template engine;

wherein the personalization engines use personalization data for each of a plurality of clients stored in a data delivery platform using an in-memory cache that is kept in sync with a master database of all client data.

20. The system of claim 19, the program stage manager further to evaluate a third stage gate expression that defines a third numerical range for third outgoing messages, wherein the third outgoing messages are sent only when the number of targeted recipients is within the numerical range.

* * * * *

UNITED STATES PATENT AND TRADEMARK OFFICE
CERTIFICATE OF CORRECTION

PATENT NO.        : 10,565,611 B2
APPLICATION NO.   : 14/802823
DATED             : February 18, 2020
INVENTOR(S)       : Boddu Page 1 of 1

It is certified that error appears in the above-identified patent and that said Letters Patent is hereby corrected as shown below:

On the Title Page

In Column 2, Item (56) under Other Publications, Line 34, delete ""psms" and insert -- "sms --, therefor.

In the Specification

In Column 6, Line 20, delete "110$_N$)," and insert -- 110$_N$,), --, therefor.

In Column 7, Line 21, delete "contentE 1;" and insert -- contentE1; --, therefor.

In Column 23, Line 21, delete "present;" and insert -- present. --, therefor.

In Column 27, Line 9, delete "PTSN," and insert -- PSTN, --, therefor.

In the Claims

In Column 38, Lines 35-36, in Claim 18, delete "rangeperform determining a mode of the stage gate decision point." and insert -- range. --, therefor.

Signed and Sealed this
Twenty-seventh Day of October, 2020

Andrei Iancu
*Director of the United States Patent and Trademark Office*